(12) United States Patent
Tokoro et al.

(10) Patent No.: US 12,722,701 B2
(45) Date of Patent: Sep. 1, 2026

(54) BACKWARD MOVEMENT CONTROL DEVICE FOR ARTICULATED VEHICLE, COMPUTER-READABLE MEDIUM STORING BACKWARD MOVEMENT CONTROL PROGRAM FOR ARTICULATED VEHICLE, AND BACKWARD MOVEMENT CONTROL METHOD FOR ARTICULATED VEHICLE

(71) Applicants: JTEKT CORPORATION, Kariya (JP); J-QUAD DYNAMICS INC., Tokyo (JP)

(72) Inventors: Hirotaka Tokoro, Tokyo (JP); Daisuke Nagasaka, Tokyo (JP); Akira Ito, Tokyo (JP)

(73) Assignees: JTEKT CORPORATION, Kariya (JP); J-QuAD DYNAMICS INC., Tokyo (JP)

(*) Notice: Subject to any disclaimer, the term of this patent is extended or adjusted under 35 U.S.C. 154(b) by 76 days.

(21) Appl. No.: 18/572,290

(22) PCT Filed: Jun. 9, 2022

(86) PCT No.: PCT/JP2022/023264

§ 371 (c)(1),
(2) Date: Dec. 20, 2023

(87) PCT Pub. No.: WO2022/270322

PCT Pub. Date: Dec. 29, 2022

(65) Prior Publication Data

US 2024/0239409 A1 Jul. 18, 2024

(30) Foreign Application Priority Data

Jun. 23, 2021 (JP) ................................ 2021-103976

(51) Int. Cl.
*B62D 15/02* (2006.01)
*B62D 6/00* (2006.01)

(52) U.S. Cl.
CPC ......... *B62D 15/0285* (2013.01); *B62D 6/002* (2013.01)

(58) Field of Classification Search
CPC .. B62D 15/0285; B62D 6/002; B62D 15/028; B62D 13/06

(Continued)

(56) References Cited

U.S. PATENT DOCUMENTS

| | | | |
|---|---|---|---|
| 9,592,851 | B2 | 3/2017 | Lavoie et al. |
| 2015/0149040 | A1 | 5/2015 | Hueger et al. |

(Continued)

FOREIGN PATENT DOCUMENTS

| | | | |
|---|---|---|---|
| DE | 102020213979 | A1 * | 5/2022 |
| JP | 2003-034261 | A | 2/2003 |
| JP | 2004-058829 | A | 2/2004 |

OTHER PUBLICATIONS

DE102020213979—English Translation (Year: 2020).*
Aug. 23, 2022 International Search Report issued in International Patent Application No. PCT/JP2022/023264.

*Primary Examiner* — Scott A Reinbold
(74) *Attorney, Agent, or Firm* — Oliff PLC

(57) ABSTRACT

A backward movement control device performs a backward movement control of an articulated vehicle including a tractor that includes steered wheels and a trailer towed by the tractor. The tractor is equipped with a steering control device that executes feedback control for causing a steered angle of the steered wheels of the tractor to follow a target steered angle. The backward movement control device includes a control unit configured to calculate the target steered angle such that a virtual steered angle follows a target virtual steered angle when a backward movement operation of the (Continued)

articulated vehicle is performed. The virtual steered angle is a steered angle of steered wheels that are virtually present in the trailer if the trailer is regarded as a rigid vehicle. The target virtual steered angle is a target value of the virtual steered angle that is set through a specific operation by an operator.

10 Claims, 9 Drawing Sheets

(58) Field of Classification Search
USPC ........................................................ 701/41
See application file for complete search history.

(56) References Cited

U.S. PATENT DOCUMENTS

| | | | | |
|---|---|---|---|---|
| 2016/0031482 | A1 | 2/2016 | Lavoie | |
| 2020/0001922 | A1* | 1/2020 | Yamamoto | B62D 15/029 |

* cited by examiner

10
P
12
Trailer
11S
Steering Mechanism
Measuring Device
50
42B
Control Unit
42
42E
Trajectory Following Control Unit
42D
Target Trajectory Generating Unit
20 (41)
Display Device (Input Device)
53
Free Space Recognition Device
PS*
SP
PS
OB
PS
α2*
α1*
α1
α1, β, V

BACKWARD MOVEMENT CONTROL DEVICE FOR ARTICULATED VEHICLE, COMPUTER-READABLE MEDIUM STORING BACKWARD MOVEMENT CONTROL PROGRAM FOR ARTICULATED VEHICLE, AND BACKWARD MOVEMENT CONTROL METHOD FOR ARTICULATED VEHICLE

TECHNICAL FIELD

The present disclosure relates to a backward movement control device for an articulated vehicle, a computer-readable medium storing a backward movement control program for an articulated vehicle, and a backward movement control method for an articulated vehicle.

BACKGROUND ART

A typical articulated vehicle includes a vehicle, which serves as a tractor, and a trailer coupled to the rear of the tractor. Driving an articulated vehicle is more difficult than driving of a rigid vehicle such as a regular passenger car. Particularly, a backward movement operation of an articulated vehicle requires a steering operation in a direction opposite to the steering operation in a case in which a rigid vehicle, to which a trailer is not coupled, is moved backward.

In this regard, a system for assisting backward movement operations of articulated vehicles has been introduced. For example, the system of Patent Literature 1 automatically steers the steered wheels of a vehicle such that a trailer moves along a reference path specified by the driver when the driver uses the accelerator pedal and the brake pedal to control the backward movement speed of the vehicle. A curvature controller of the system executes a control for backing the trailer along the reference path based on the steered angle of the tractor. The curvature controller includes a curvature regulator and a hitch angle regulator.

The curvature regulator calculates a target hitch angle based on the current steered angle provided by a measurement module and a target curvature of the trailer path input by the driver through an input device. The hitch angle regulator calculates a steered angle command for an electric power steering system through execution of feedback control of the hitch angle, thereby causing the current hitch angle to follow the target hitch angle calculated by the curvature regulator. The electric power steering system turns the steering wheel based on the steered angle command.

CITATION LIST

Patent Literature

Patent Literature 1: U.S. Pat. No. 9,592,851

SUMMARY OF INVENTION

Technical Problem

The system of Patent Literature 1 has a concern as follows. The curvature regulator calculates the target hitch angle, which is a target value of the hitch angle regulator, by using the steered angle, which is the operation amount of the hitch angle regulator. There is a possibility that the convergence of the hitch angle to the target hitch angle may decrease because the target value of the hitch angle regulator changes due to its own operation. Therefore, it is difficult to move the articulated vehicle backward with a curvature that is intended by the driver and is input through the input device. Accordingly, it is difficult to cause the articulated vehicle to reach a desired position.

Solution to Problem

One aspect of the present disclosure provides a backward movement control device for an articulated vehicle. The articulated vehicle includes a tractor including steered wheels that change a traveling direction of the articulated vehicle and a trailer towed by the tractor. The tractor is equipped with a steering control device configured to execute feedback control for causing a steered angle of the steered wheels to follow a target steered angle. The backward movement control device includes a control unit configured to calculate the target steered angle such that a virtual steered angle follows a target virtual steered angle when a backward movement operation of the articulated vehicle is performed. The virtual steered angle is a steered angle of steered wheels that are virtually present in the trailer if the trailer is regarded as a rigid vehicle. The target virtual steered angle is a target value of the virtual steered angle that is set through a specific operation by an operator.

Another aspect of the present disclosure provides a computer-readable medium storing a backward movement control program executed by a backward movement control device for an articulated vehicle. The articulated vehicle includes a tractor including steered wheels that change a traveling direction of the articulated vehicle and a trailer towed by the tractor. The tractor is equipped with a steering control device configured to execute feedback control for causing a steered angle of the steered wheels to follow a target steered angle. The backward movement control program is configured to cause, when a backward movement operation of the articulated vehicle is performed, the backward movement control device to execute a first process of setting a target virtual steered angle, a second process of calculating the target steered angle such that a virtual steered angle follows the target virtual steered angle set in the first process, and a third process of supplying the target steered angle calculated in the second process to the steering control device. The virtual steered angle is a steered angle of steered wheels that are virtually present in the trailer if the trailer is regarded as a rigid vehicle. The target virtual steered angle is a target value of the virtual steered angle that is set through a specific operation by an operator.

A further aspect of the present disclosure provides a backward movement control method for an articulated vehicle. The articulated vehicle includes a tractor including steered wheels that change a traveling direction of the articulated vehicle and a trailer towed by the tractor. The tractor is equipped with a steering control device configured to execute feedback control for causing a steered angle of the steered wheels to follow a target steered angle. The backward movement control method includes calculating the target steered angle such that a virtual steered angle follows a target virtual steered angle when a backward movement operation of the articulated vehicle is performed. The virtual steered angle is a steered angle of steered wheels that are virtually present in the trailer if the trailer is regarded as a rigid vehicle. The target virtual steered angle is a target value of the virtual steered angle that is set through a specific operation by an operator.

BRIEF DESCRIPTION OF DRAWINGS

FIG. 5 is a block diagram of the articulated vehicle shown in FIG. 1.

FIG. 6 is a block diagram showing a control configuration of the articulated vehicle shown in FIG. 1.

DESCRIPTION OF EMBODIMENTS

First Embodiment

A first embodiment of the present disclosure will now be described.

Figure 1:
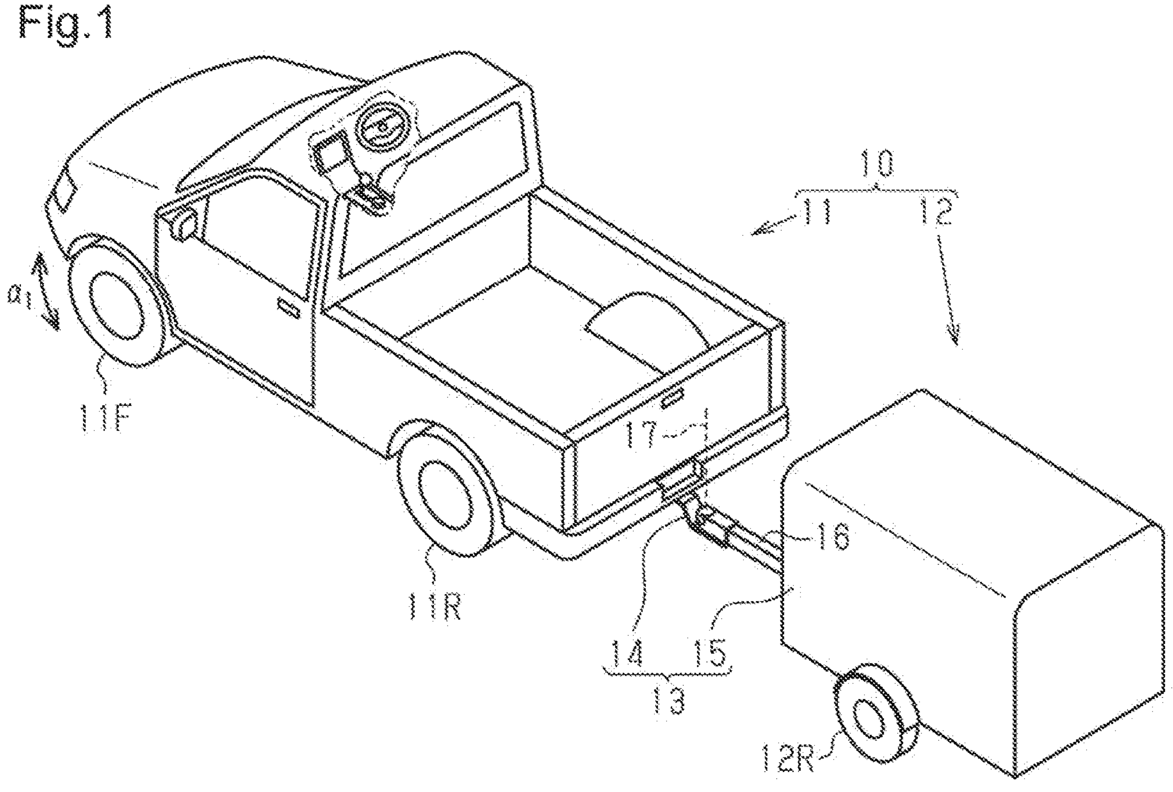
FIG. 1 is a perspective view of an articulated vehicle according to a first embodiment.

As shown in FIG. 1, an articulated vehicle 10 includes a tractor 11 and a trailer 12. There are various types of tractor 11. In the first embodiment, a pickup truck, which is a kind of small truck, is used as an example of the tractor 11. The tractor 11 includes two front wheels 11F and two rear wheels 11R. The front wheels 11F include a right front wheel and a left front wheel, and the rear wheels 11R include a right rear wheel and a left rear wheel. FIG. 1 only shows the left front wheel and the left rear wheel. The front wheels 11F and a steering wheel are coupled to each other in a power transmittable manner via, for example, a steering mechanism. The front wheels 11F is steered wheels. The steered wheels refer to wheels that change the traveling direction of the tractor 11 by moving in response to operation of the steering wheel.

The trailer 12 may have various shapes and sizes depending on the application. The first embodiment uses a box-shaped trailer 12 as an example. The trailer 12 includes two wheels 12R. The wheels 12R include a right wheel and a left wheel. However, FIG. 1 only shows the left wheel.

The trailer 12 is towed by being coupled to a rear portion of the tractor 11. The trailer 12 is connected to the rear portion of the tractor 11 with a ball joint 13. The ball joint 13 includes a hitch ball 14 and a hitch coupler 15. The hitch ball 14 is provided at the rear portion of the tractor 11 with a hitch member. The hitch coupler 15 is provided at the tip of a tongue 16 projecting from a front portion of the trailer 12. When the hitch coupler 15 is attached to the hitch ball 14, the trailer 12 is coupled to the tractor 11 so as to be pivotal about an axis 17. The axis 17 extends in a height direction of the tractor 11.

Figure 2:
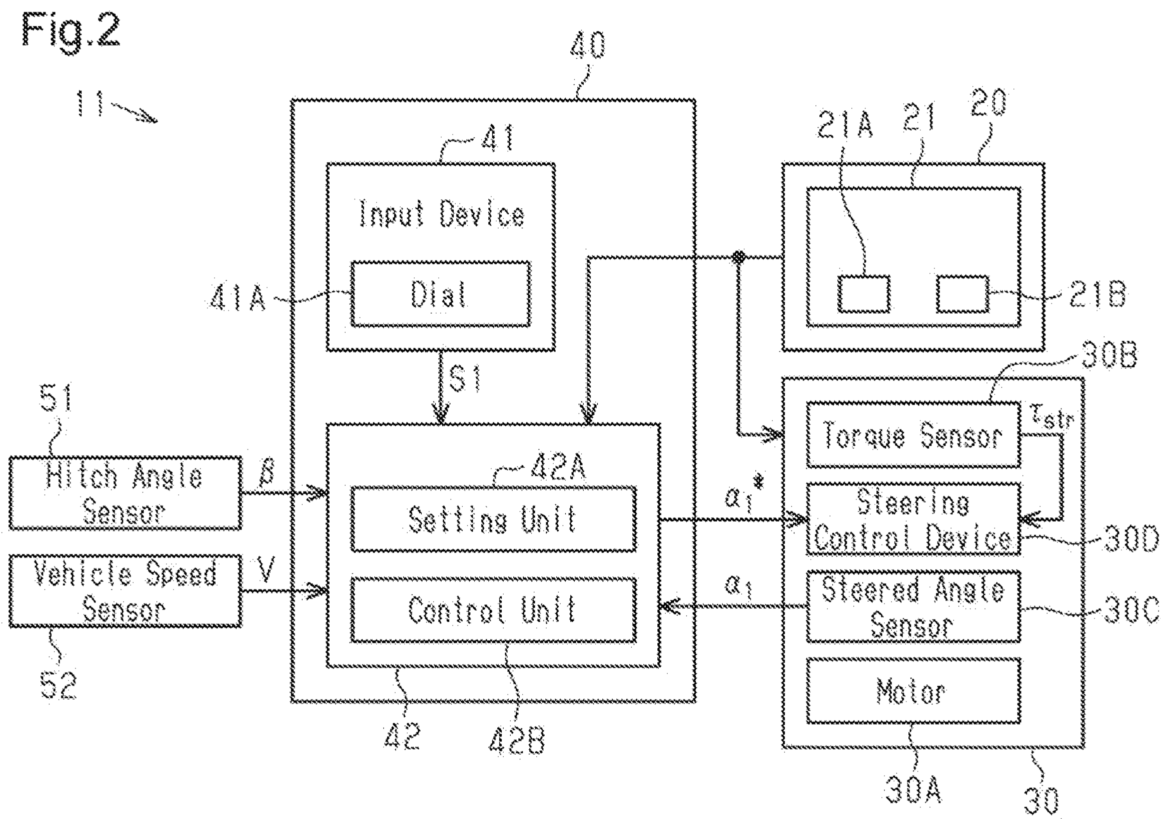
FIG. 2 is a block diagram of a backward movement assistance device mounted on the articulated vehicle shown in FIG. 1.

As shown in FIG. 2, the tractor 11 is equipped with a display device 20, a power steering device 30, and a backward movement assistance device 40.

The display device 20 is provided on, for example, an instrument panel in the passenger compartment. The display device 20, for example, is a touch screen. By touching the display on a screen 21 of the display device 20, it is possible to input data or give instructions for vehicle on-board devices. For example, an assistance start button 21A and an assistance end button 21B are displayed on the screen 21. The assistance start button 21A is operated to activate a backward movement assistance function of the articulated vehicle 10. The assistance end button 21B is operated to deactivate the backward movement assistance function of the articulated vehicle 10.

The power steering device 30 is a system for assisting an operator to steer the steering wheel and includes a motor 30A, a torque sensor 30B, a steered angle sensor 30C, and a steering control device 30D. The operator includes a driver who drives the articulated vehicle 10 in the passenger compartment of the tractor 11.

The motor 30A generates assisting force. The assisting force is a force for assisting steering of the steering wheel. The torque of the motor 30A is transmitted to the front wheels 11F by being applied to the steering mechanism via a speed reduction mechanism. The torque sensor 30B detects a steering torque $\tau_{str}$ that is a torque applied to the steering wheel. The steered angle sensor 30C detects a steered angle $\alpha_1$, which is the turned angle of the front wheels 11F, based on, for example, a rotation angle of the motor 30A. The front wheels 11F and the motor 30A are interlinked with each other via the steering mechanism. Accordingly, there is a correlation between the rotation angle of the motor 30A and the steered angle $\alpha_1$ of the front wheels 11F. The steered angle $\alpha_1$ of the front wheels 11F can thus be obtained based on the rotation angle of the motor 30A.

The steering control device 30D executes an assist control when the backward movement assistance function of the articulated vehicle 10 is deactivated. The steering control device 30D controls energization to the motor 30A based on the steering torque $\tau_{str}$ detected through the torque sensor 30B, thereby causing the motor 30A to generate an assisting force corresponding to the steering torque $\tau_{str}$.

The steering control device 30D executes a steering control of the front wheels 11F when the backward movement assistance function of the articulated vehicle 10 is activated. When the backward movement assistance function of the articulated vehicle 10 is activated, the steering control device 30D controls the steered angle $\alpha_1$ of the front wheels 11F by controlling the rotation angle of the motor 30A based on a target steered angle $\alpha_1$*, which is generated by the backward movement assistance device 40. The target steered angle $\alpha_1$* is a target value of the steered angle $\alpha_1$ of the front wheels 11F. The steering control device 30D controls operation of the motor 30A through execution of feedback control of the steered angle $\alpha_1$ so that the steered angle $\alpha_1$ of the front wheels 11F detected through the steered angle sensor 30C agrees with the target steered angle $\alpha_1$*.

When the backward movement assistance function of the articulated vehicle 10 is activated, the backward movement assistance device 40 assists a backward movement operation of the articulated vehicle 10. The backward movement assistance device 40 calculates the target steered angle $\alpha_1$* of the front wheels 11F based on a backward movement direction or a backward movement path of the articulated vehicle 10 specified by the operator and the steered angle $\alpha_1$ of the front wheels 11F detected through the steered angle sensor 30C. The target steered angle $\alpha_1$* is a target value of the steered angle $\alpha_1$ of the front wheels 11F required for the articulated vehicle 10 to move in the backward movement direction or along the backward movement path of the articulated vehicle 10, which are specified by the operator. The backward movement assistance device 40 does not calculate the target steered angle $\alpha_1$* when the backward movement assistance function of the articulated vehicle 10 is deactivated.

Backward Movement Assistance Device

The backward movement assistance device 40 will now be described.

As shown in FIG. 2, the backward movement assistance device 40 includes an input device 41 and a backward movement control device 42.

The input device 41 includes a dial 41A as an operation member. The dial 41A is provided in, for example, the center console in the passenger compartment. The dial 41A is operated when the driver specifies the backward movement direction or the backward movement path of the articulated vehicle 10. The backward movement direction or the backward movement path includes, for example, a backward left turn, a backward right turn, and a straight backward movement. When the articulated vehicle 10 is caused to move backward and turn left, the dial 41A is operated counterclockwise with reference to a reference position, which corresponds to a straight path. When the articulated vehicle 10 is caused to move backward and turn right, the dial 41A is operated clockwise with reference to the reference position. When the articulated vehicle 10 is caused to move backward in straight line, the dial 41A is maintained at the reference position. The input device 41 generates an electric signal S1 that corresponds to an operation amount or an operation position of the dial 41A with reference to the reference position.

The backward movement control device 42 includes processing circuitry including any one of the following three configurations A1, A2, and A3.

A1: One or more processors that operate according to a computer program, which is software. The processor includes a central processing unit (CPU) and a memory.

A2: One or more dedicated hardware circuits such as application specific integrated circuits (ASICs) that perform at least part of various types of processes.

A3: A combination of the configurations A1 and A2.

The memory is a medium that can be read by a computer, for example, a CPU, and stores programs that describe processes or instructions for the computer. The memory includes a random-access memory (RAM) and a read-only memory (ROM). The CPU executes various kinds of control by executing programs stored in the memory at a predetermined calculation cycle. The programs include a program for executing a backward movement assistance control of the articulated vehicle 10. The backward movement assistance control refers to a control for assisting the backward movement operation of the articulated vehicle 10.

The backward movement control device 42 executes the backward movement assistance control of the articulated vehicle 10. The backward movement control device 42 starts execution of the backward movement assistance control when the operator performs an operation for starting the backward movement assistance control. The backward movement control device 42 terminates the execution of the backward movement assistance control when the operator performs an operation for terminating the backward movement assistance control. The starting operation and the terminating operation of the backward movement assistance control by the operator are performed through the display device 20. The backward movement control device 42 starts execution of the backward movement assist control when the operator performs a starting operation of the backward movement assistance control, that is, when the operator touches the assistance start button 21A displayed on the screen 21 of the display device 20. The backward movement control device 42 terminates the execution of the backward movement assist control when the operator performs a terminating operation of the backward movement assistance control, that is, when operator touches the assistance end button 21B displayed on the screen 21 of the display device 20.

When executing the backward movement assistance control, the backward movement control device 42 controls the backward movement path of the articulated vehicle 10 through the power steering device 30 such that the articulated vehicle 10 moves in the backward movement direction or along the backward movement path of the articulated vehicle 10, which are specified by the operator.

The backward movement control device 42 includes a setting unit 42A and a control unit 42B.

The setting unit 42A sets a target virtual steered angle $\alpha_2$* of the trailer 12 based on the electric signal S1 generated by the input device 41, that is, the operation amount or the operation position with respect to the reference position of the dial 41A. The target virtual steered angle $\alpha_2$* is a target value of the virtual steered angle $\alpha_2$ of the trailer 12. The virtual steered angle $\alpha_2$ refers to an apparent steering angle when the trailer 12 is virtually separated from the tractor 11 and regarded as a rigid vehicle with virtual front wheels. The setting unit 42A calculates the target virtual steered angle $\alpha_2$* that corresponds to the operation amount or the operation position of the dial 41A. This is achieved by the CPU calculating the target virtual steered angle $\alpha_2$* through map calculation using a map stored in the memory, for example. This map defines the relationship between the operation amount or the operation position of the dial 41A and the target virtual steered angle $\alpha_2$* of the trailer 12. The operator can specify, through operation of the dial 41A, the target virtual steered angle $\alpha_2$* that corresponds to a desired backward movement path along which the trailer 12 is caused to move backward.

The control unit 42B receives the target virtual steered angle $\alpha_2$* set by the setting unit 42A, a hitch angle $\beta$ detected through a vehicle on-board hitch angle sensor 51, a vehicle speed V detected through a vehicle on-board vehicle speed sensor 52, and the steered angle $\alpha_1$ detected through the steered angle sensor 30C. The hitch angle $\beta$ is an angle formed by a central axis extending in a longitudinal direction of the tractor 11, which is a front-rear direction, and a central axis extending in a longitudinal direction of the trailer 12, which is a front-rear direction. The hitch angle $\beta$ is also referred to as a bending angle of the trailer 12 with respect to the tractor 11.

The control unit 42B calculates the target steered angle $\alpha_1$* of the front wheels 11F of the tractor 11 based on the target virtual steered angle $\alpha_2$* set by the setting unit 42A, and the hitch angle $\beta$, the vehicle speed V, and the steered angle $\alpha_1$ detected through various sensors. The control unit 42B calculates the target steered angle $\alpha_1$* of the front wheels 11F such that the virtual steered angle $\alpha_2$ of the trailer 12 converges to the target virtual steered angle $\alpha_2$*. The control unit 42B calculates the target steered angle $\alpha_1$* of the front wheels 11F through execution of feedback control of the virtual steered angle $\alpha_2$ such that the virtual steered angle $\alpha_2$ of the trailer 12 agrees with the target virtual steered angle $\alpha_2$*.

Motion Model of Articulated Vehicle

Next, a motion model representing the behavior of the articulated vehicle 10, which performs planar motion, will be described.

Figure 3:
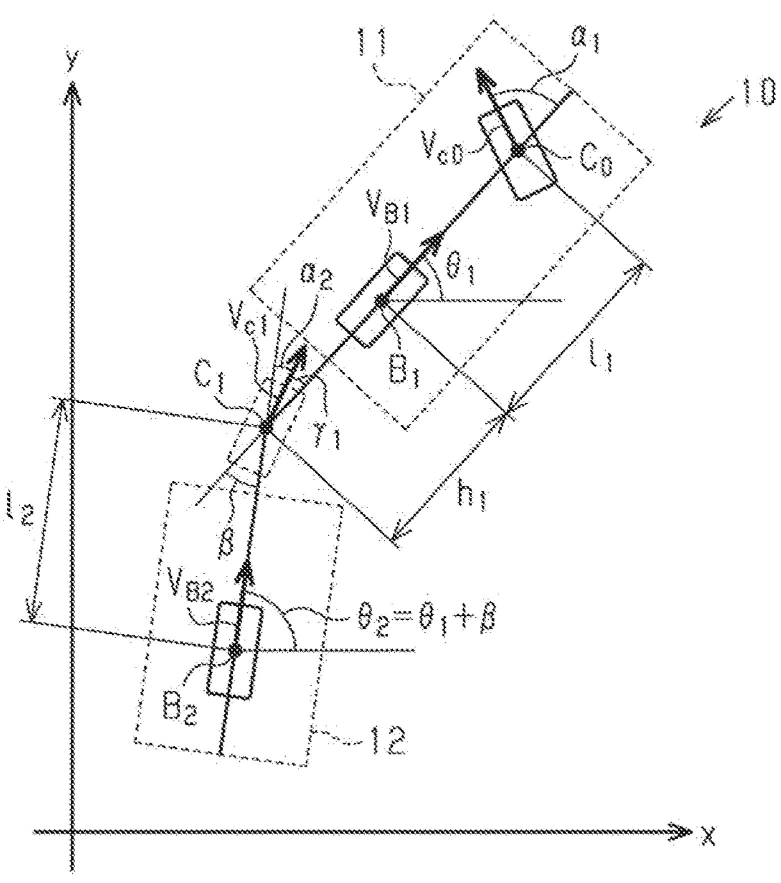
FIG. 3 is a motion model of the articulated vehicle shown in FIG. 1.

As shown in FIG. 3, the motion model of the articulated vehicle 10 can be regarded as an equivalent model in which the left and right wheels are moved to the central axis of the vehicle body in a two-dimensional XY-coordinate system fixed to the ground. For example, the equivalent model may employ a two-wheel model in which the two front wheels 11F and the two rear wheels 11R of the tractor 11 are regarded as a single front wheel 11F and a single rear wheel 11R. The equivalent model may also employ a two-wheel model in which the wheels 12R are regarded as a single wheel 12R and the trailer 12 includes a single virtual front wheel, which will be discussed below. The motion model of FIG. 3 is a motion model when the articulated vehicle 10 moves forward. In the motion model of FIG. 3, in order to clarify the behavior of the articulated vehicle 10 within the scope of kinematics, it is assumed that no lateral skidding occurs in the tires of the articulated vehicle 10 at extremely low speeds, and that the vehicle 10 has a velocity vector only in its traveling direction. It is also assumed that the vehicle is driven at a constant speed. It is also assumed that the road surface is flat and there is no disturbance from the outside of the articulated vehicle 10.

In the motion model of FIG. 3, parameters of the articulated vehicle 10 used to describe the kinematic relationship between the tractor 11 and the trailer 12 are as follows.

- $C_0$: the front wheels 11F of the tractor 11
- $B_1$: the rear wheels 11R of the tractor 11
- $C_1$: the hitch point of the tractor 11 (point indicating the position of the hitch ball 14)
- B2: the wheels 12R of the trailer 12
- $V_{C0}$: the velocity vector of the front wheels 11F of the tractor 11
- $V_{B1}$: the velocity vector of the rear wheels 11R of the tractor 11
- $V_{C1}$: the velocity vector of the hitch point $C_1$ of the tractor 11
- $V_{B2}$: the velocity vector of the trailer 12
- $\alpha_1$: the steered angle of the front wheels 11F of the tractor 11
- $\alpha_2$: the virtual steered angle of the trailer 12
- $\gamma_1$: an intermediate variable (angle formed by the central axis of the tractor 11 and the velocity vector $V_{C1}$ of the hitch point $C_1$)
- $\theta_1$: the orientation angle of the tractor 11 (angle formed by the central axis of the tractor 11 and the X-axis)
- $\theta_2$: the orientation angle of the trailer 12 (angle formed by the central axis of the trailer 12 and the X-axis)
- $\beta$: the hitch angle (angle formed by the central axis of the tractor 11 and the central axis of the trailer 12)
- $l_1$: the wheelbase of the tractor 11
- $h_1$: the distance between the rear wheels 11R of the tractor 11 and the hitch point $C_1$
- $l_2$: the virtual wheelbase of the trailer 12

The respective signs of the above parameters are as follows. That is, the tractor orientation angle $\theta_1$ is positive in the counterclockwise direction with reference to the X-axis. The steered angle $\alpha_1$ of the front wheels 11F of the tractor 11 and the intermediate variable $\gamma_1$ are positive in the counterclockwise direction with reference to the central axis of the tractor 11. The hitch angle $\beta$ is positive in a counterclockwise direction with reference to the central axis of the tractor 11 or an extension thereof. The vehicle speed V is positive when the vehicle moves forward and negative when the vehicle moves backward.

Figure 4:
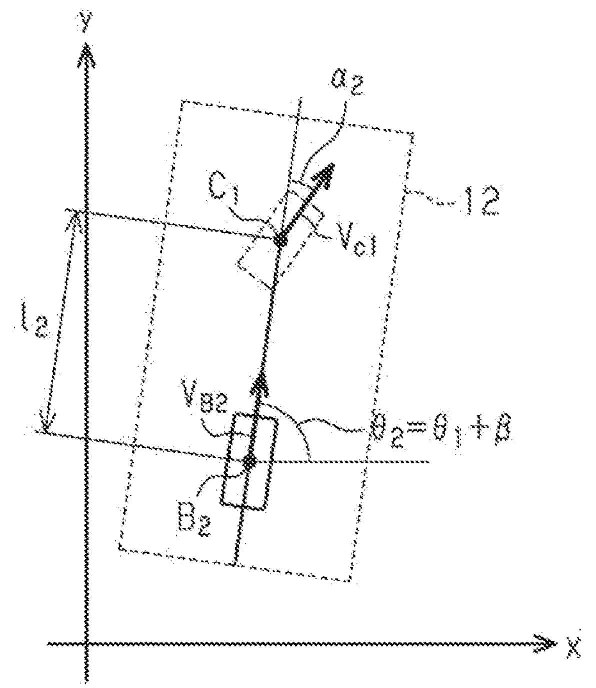
FIG. 4 is a motion model of the trailer shown in FIG. 1.

As shown in FIG. 3, the tractor 11 moves in accordance with the velocity vector $V_{C0}$ of the front wheels 11F. Further, the trailer 12 moves in accordance with the velocity vector $V_{C1}$ of the hitch point $C_1$, which is a coupling point with the tractor 11. Accordingly, the velocity vector $V_{C1}$ of the hitch point $C_1$ as viewed from the trailer 12 can be regarded as a velocity vector of virtual front wheels of the trailer 12. In the motion model of FIG. 3, the angle formed by the velocity vector $V_{C1}$ at the hitch point $C_1$ and the central axis of the trailer 12 is $\beta-\gamma_1$. In this case, as shown in FIG. 4, if the trailer 12 is virtually separated from the tractor 11 and is regarded as a rigid vehicle having virtual front wheels, the virtual front wheels can be regarded as being steered at the virtual steered angle $\alpha_2$ ($\alpha_2=-(\beta-\gamma_1)$), which is an apparent steered angle. This shows that the trailer 12 can be regarded as a rigid vehicle. In a motion model of the articulated vehicle 10 in backward movement, the velocity vectors are in opposite directions to those in the motion model during forward movement shown in FIG. 3.

When the trailer 12 is regarded as a rigid vehicle with virtual front wheels, the yaw motion of the trailer 12 can be considered in the same way as the yaw motion of the tractor 11.

Figures 5, 6:
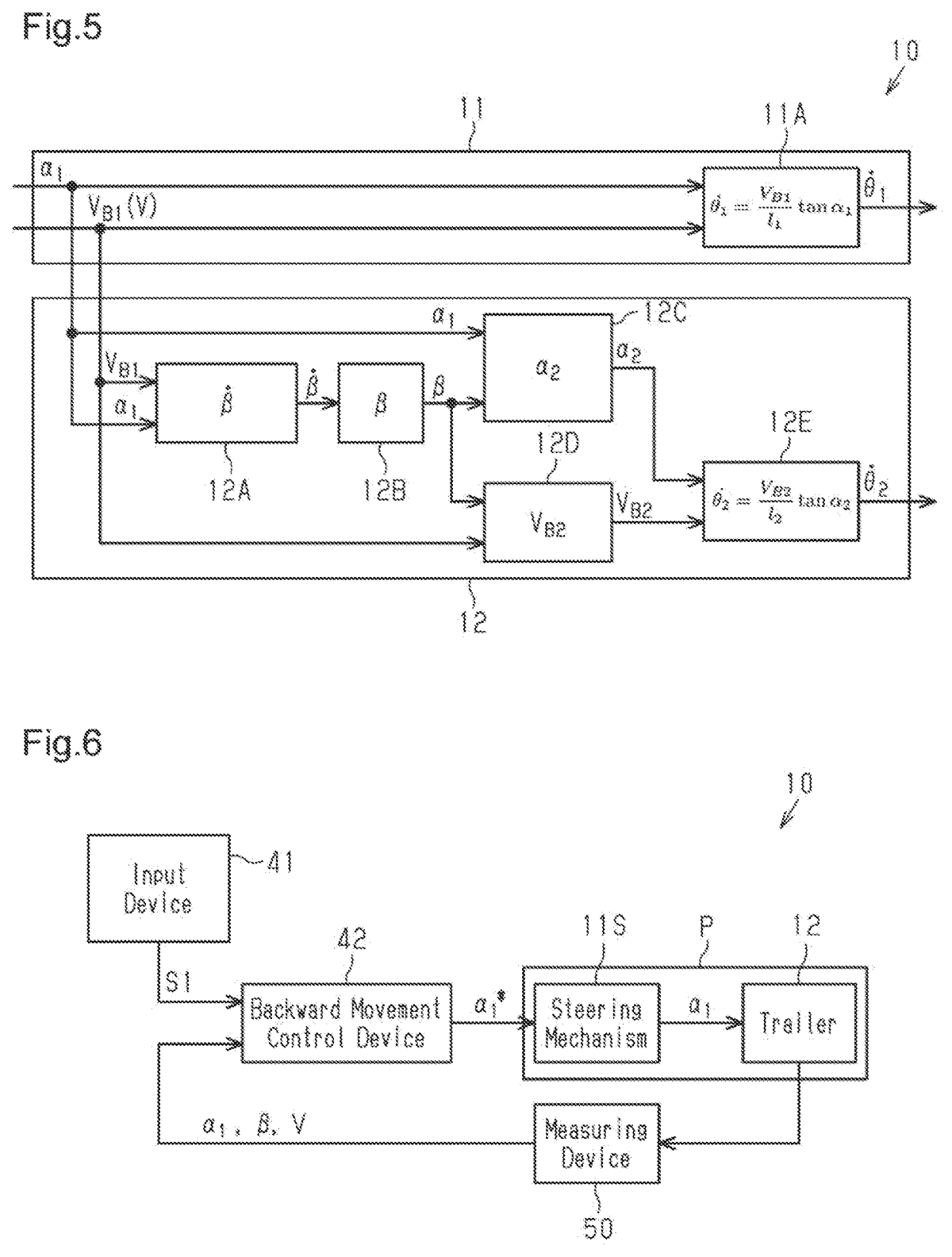

As shown in the block diagram of FIG. 5, the model of the tractor 11 in the articulated vehicle 10 has a model block 11A. The model of the trailer 12 in the articulated vehicle 10 includes model blocks 12A, 12B, 12C, 12D, and 12E.

The model block 11A calculates an orientation angular velocity $\theta_1(\bullet)$ of the tractor 11 using the steered angle $\alpha_1$ of the front wheels 11F of the tractor 11 and the velocity vector $V_{B1}$ of the rear wheels 11R of the tractor 11. Specifically, the model block 11A calculates the orientation angular velocity $\theta_1(\bullet)$ of the tractor 11 by applying the steered angle $\alpha_1$ of the front wheels 11F of the tractor 11 and the velocity vector $V_{B1}$ of the rear wheels 11R of the tractor 11 to an equation of motion representing the yaw motion of the tractor 11. The equation of motion representing the yaw motion of tractor 11 is as expressed in the model block 11A. The dot • indicates a time derivative. The orientation angular velocity $\theta_1(\bullet)$ of the tractor 11 is the yaw rate of the tractor 11. The velocity vector $V_{B1}$ of the rear wheels 11R of the tractor 11 corresponds to the velocity vector of the tractor 11.

The model block 12A calculates a hitch angular velocity $\beta(\bullet)$ based on the steered angle $\alpha_1$ of the front wheels 11F of the tractor 11 and the velocity vector $V_{B1}$ of the rear wheels 11R of the tractor 11. The model block 12B calculates the hitch angle $\beta$ by integrating the hitch angular velocity $\beta(\bullet)$ calculated by the model block 12A. The model block 12C calculates the virtual steered angle $\alpha_2$ of the trailer 12 based on the steered angle $\alpha_1$ of the front wheels 11F of the tractor 11 and the hitch angle $\beta$ calculated by the model block 12B. The model block 12D calculates the velocity vector $V_{B2}$ of the trailer 12 based on the hitch angle $\beta$ calculated by the model block 12B and the velocity vector $V_{B1}$ of the rear wheels 11R of the tractor 11.

The model block 12E calculates an orientation angular velocity $\theta_2(\bullet)$ of the trailer 12 using the virtual steered angle $\alpha_2$ of the trailer 12 calculated by the model block 12C and the velocity vector $V_{B2}$ of the trailer 12 calculated by the model block 12D. Specifically, the model block 12E calculates the orientation angular velocity $\theta_2(\bullet)$ of the trailer 12 by applying the virtual steered angle $\alpha_2$ of the trailer 12 and the velocity vector $V_{B2}$ of the trailer 12 to an equation of motion representing the yaw motion of the trailer 12. The equation of motion representing the yaw motion of trailer 12 is as expressed in the model block 12E. The dot • indicates a time derivative. The orientation angular velocity $\theta_2(\bullet)$ of the trailer 12 is the yaw rate of the trailer 12.

As expressed in the model blocks 11A and 12E of FIG. 5, the equation of motion representing the yaw motion of the trailer 12 can be described by an equation of motion similar to the equation of motion representing the yaw motion of the tractor 11. That is, when the trailer 12 is regarded as a rigid vehicle having virtual front wheels, the yaw motion of the trailer 12 can be examined in the same manner as the yaw motion of the tractor 11 regarded as a rigid vehicle.

Feedback Control System of Articulated Vehicle

Next, a feedback control system of the articulated vehicle 10 at the time of execution of the backward movement assistance control will be described.

As shown in the block diagram of FIG. 6, the feedback control system of the articulated vehicle 10 includes a backward movement control device 42, which is a controller, and a plant P, which is a controlled object. When the backward movement assistance control is executed, the backward movement control device 42 controls the plant P in accordance with the electric signal S1 generated by the input device 41 and measurement results of a measuring device 50. The electric signal S1 indicates the operation amount or the operation position of the dial 41A with respect to the reference position, and reflects the backward movement direction or the backward movement path of the articulated vehicle 10 specified by the operator. The measuring device 50 measures the output of the plant P and includes the steered angle sensor 30C, the hitch angle sensor 51, and the vehicle speed sensor 52. The plant P is a controlled object of the backward movement control device 42 and includes the steering mechanism 11S of the tractor 11 and the trailer 12.

The backward movement control device 42 determines the value of the target steered angle $\alpha_1$*, which is an input to the plant P, in accordance with the electric signal S1 generated by the input device 41, and the steered angle $\alpha_1$ of the front wheels 11F of the tractor 11, the hitch angle $\beta$, and the vehicle speed V, which are output by the plant P.

The backward movement control device 42 calculates the target steered angle $\alpha_1$* by using, for example, nonlinear model predictive control (NMPC). The nonlinear model predictive control is a model predictive control for a system in which a controlled object is nonlinear. The model predictive control is a control method for performing optimization while predicting future responses at each point in time. For example, the model predictive control may perform feedback control while calculating an optimization problem online at a high speed.

In the model predictive control, a predictive model, for example, a controlled object model is stored in an internal memory of the backward movement control device 42, which is a controller, to predict a future behavior of the plant P, which is a controlled object, over a certain finite interval from the current point in time. In order to perform this control, it is necessary to appropriately capture the dynamic characteristics of the controlled object, i.e., the behavior of the controlled object and express them as a model. An example of the prediction model is a state equation.

A state quantity x(t) is expressed by the following Expression 1.

$$x(t) = [\beta(t)\ \alpha_1(t)]^T \quad \text{[Expression 1]}$$

In Expression 1, $\beta$ represents a hitch angle and $\alpha_1$ represents the steered angle $\alpha_1$ of the front wheels 11F. In addition, t represents a point in time, and T represents a finite time.

An operation amount u(t) is expressed by the following Expression 2. The operation amount u(t) is a control input to the plant P, which is a controlled object.

$$u(t) = \alpha_{1_{tgt}}(t) \quad \text{[Expression 2]}$$

In Expression 2, $\alpha_{1tgt}$ represents the target steered angle $\alpha_1$*, and t represents a point in time.

The state equation is expressed by the following Expression 3. The state equation expressed by Expression 3 is a model that defines a state of an articulated vehicle system and a series of first-order differential equations representing the time variation of each state.

$$\dot{x}(t) = \begin{bmatrix} \dot{x}_1 \\ \dot{x}_2 \end{bmatrix} = \begin{bmatrix} -\frac{V_{B1}}{l_2}\sin(x_1(t)) - \frac{V_{B1}}{l_1 l_2}(l_2 + h_1\cos(x_1(t)))\tan(x_2(t)) \\ (u(t) - x_2(t))/\tau_{str} \end{bmatrix} \quad \text{[Expression 3]}$$

In Expression 3, $x_1$ represents the hitch angle $\beta$. Also, $x_2$ represents the steered angle $\alpha_1$ of the front wheels 11F of the tractor 11. $V_{B1}$ represents the velocity vector of the rear wheels 11R of the tractor 11. $l_1$ represents the wheelbase of the tractor 11. $l_2$ represents the virtual wheelbase of the trailer 12. $l_2$ represents the distance between the hitch point $C_1$, which is the virtual front wheels of the trailer 12, and the wheels 12R, which are the rear wheels of the trailer 12. Further, $h_1$ represents the distance between the rear wheels 11R of the tractor 11 and the hitch point $C_1$, t represents a point in time, and $\tau_{str}$ represents a time constant of a steering response characteristic approximated by a first order lag characteristic.

The equation of motion for the hitch angle $\beta$ shown in the upper part of Expression 3 includes a feedthrough, which is the term of the steered angle $\alpha_1$ ($\alpha_1 = x_2(t)$) of the front wheels 11F of the tractor 11. The input that corresponds to the feedthrough is immediately reflected in the output. For this reason, as indicated by in the equation of motion for the steered angle $\alpha_1$ in the lower part of the equation of state of Expression 3, the equation of state of Expression 3 uses a model that takes into consideration the response characteristic of the steering mechanism 11S to obtain a controllable configuration by eliminating the influence of the feedthrough.

An output equation is expressed by the following Expression 4.

$$y(t) = -x_1(t) - \operatorname{atan}\left(\frac{h_1}{l_1}\tan(x_2(t))\right) \quad \text{[Expression 4]}$$

In Expression 4, y represents an internal controlled variable of the backward movement control device 42, which is a controller, and is the virtual steered angle $\alpha_2$ of the trailer 12 in the first embodiment. Also, atan is an arctangent function, and t represents a point in time.

In order to perform a control, it is necessary to use predicted results to determine the operation amount u(t), which is a control input to be given to the plant P, which is the controlled object. In other words, it is necessary to use predicted results to determine the target steered angle $\alpha_1$*. Therefore, in the model predictive control, the control input is uniquely determined by solving an optimization problem at a fixed sampling cycle. In other words, in the model predictive control, at each point in time t, an optimization problem is examined that minimizes the evaluation function from the point in time t up to the finite time T into the future.

An evaluation function J(u, t) is expressed by the following Expression 5.

$$J(u,t)=\int_{t}^{t+T}L(x(\tau),U(\tau))d\tau \quad \text{[Expression 5]}$$

In Expression 5, U(τ) represents a controlled variable of the plant P from the point in time t to the point in time t+T. In other words, U(τ) represents the steered angle $\alpha_1$ of the front wheels 11F of the tractor 11, which is the actual control output from the plant P. Further, x(τ) represents a predicted value of a state quantity starting from the state quantity x(t) at the point in time t under an operation amount u(τ), which is a control input from the point in time t to the point in time t+T. Therefore, the initial condition of the optimization problem is x(τ)=x(x). L(x, u) is a scalar-value function representing a control purpose and includes, for example, an error from a target state or the magnitude of a control input. Also, τ is the current point in time, and the relational expression t≤τ≤t+T is satisfied.

The scalar-value function L(x, u) is expressed by the following Expression 6.

$$L(x(\tau),u(\tau))=(y(x(\tau))-y_{ref})^{T}Q(y(x(\tau))-y_{ref})+U(\tau)^{T}RU(\tau) \quad \text{[Expression 6]}$$

In Expression 6, y(x(τ)) represents the current predicted value of the virtual steered angle $\alpha_2$ of the trailer 12, which is an internal controlled variable of the backward movement control device 42. Also, $y_{ref}$ represents the target virtual steered angle $\alpha_2$* of the trailer 12, which is an internal target value of the backward movement control device 42. U(τ) represents the operation amount for the plant P, that is, the target steered angle $\alpha_1$*, which is a control input to the plant P. The first term on the right side of Expression 6 is the deviation between the current predicted value of the virtual steered angle $\alpha_2$ of the trailer 12 and the target virtual steered angle $\alpha_2$*. The second term on the right side of Expression 6 is the magnitude of the target steered angle $\alpha_1$*, which is the operation amount for the plant P. Q is a weighting matrix for the deviation between the current predicted value of the virtual steered angle $\alpha_2$ of the trailer 12 and the target virtual steered angle $\alpha_2$*. R is a weighting matrix for the magnitude of the target steered angle $\alpha_1$*. Each element of the weighting matrices Q and R is a tuning parameter and is set through, for example, computer simulations.

The function to be optimized is the operation amount u(τ), which is a control input from the point in time t to the point in time t+T. The backward movement control device 42 obtains the operation amount u(τ), which is an optimum control input, by solving the above optimization problem for minimizing the evaluation function J(u, t) from each point in time t to the finite time T into the future using a specified numerical optimization algorithm, and uses only the initial value of the operation amount u(t) as the manipulated variable u(t), which is the actual control input at the point in time t. The backward movement control device 42 solves the optimization problem at a fixed sampling cycle Δt. For example, at the next sampling point in time t+Δt, the backward movement control device 42 obtains an operation amount u(τ+Δt), which is an optimum control input for minimizing the evaluation function J(u, t) from the sampling point in time t+Δt to a sampling point in time t+Δt+T, and uses only the initial value of the operation amount u(τ+Δt) as the operation amount u(t+Δt), which is the actual control input at the point in time t+Δt. Thereafter, the backward movement control device 42 sequentially repeats the process of solving the optimization problem and determining the operation amount u(t), which is a control input, each time the next sampling point in time is reached.

In the model predictive control, when prediction is performed at each sampling point in time, the state quantity x(t) at the current time is corrected with values measured by the measuring device 50. In other words, the model predictive control corrects the initial value of prediction at each cycle. Therefore, the model predictive control is a state feedback control. As shown in the block diagram of FIG. 6, the articulated vehicle system includes one feedback loop in which the state of the plant P is fed back to the backward movement control device 42.

As shown in Expressions 5 and 6, in the evaluation function J(u, t), the weighting matrix Q is given to the deviation between the target virtual steered angle $\alpha_2$* and the current predicted value of the virtual steered angle $\alpha_2$ of the trailer 12, which is the internal controlled variable of the backward movement control device 42. In addition, in the evaluation function J(u, t), the weighting matrix R is given to the magnitude of the target steered angle $\alpha_1$*, which is the operation amount for the plant P. Accordingly, it is possible to prevent the target steered angle $\alpha_1$* from being calculated as an excessive value, while reducing the deviation between the current predicted value and the previous predicted value of the virtual steered angle $\alpha_2$ of the trailer 12. Further, by making the weighting matrix R of the steered angle $\alpha_1$ of the tractor 11 sensitive to the steering angular velocity, it is possible to suppress a rapid change in the target steered angle $\alpha_1$*. As the weight by the weighting matrix R is increased, the quick response of the target steered angle $\alpha_1$* is further suppressed. Conversely, as the weight by the weighting matrix R is decreased, the quick response of the target steered angle $\alpha_1$* is further improved.

Procedure of Backward Movement Assistance Control

Next, a procedure of the backward movement assistance control by the backward movement control device 42 will be described. The backward movement control device 42 starts execution of the backward movement assistance control when the operator performs an operation starting the backward movement assistance control, that is, when the operator touches the assistance start button 21A displayed on the screen 21 of the display device 20. For example, the backward movement control device 42 executes the backward movement assistance control according to a backward movement control program stored in the internal memory.

Figure 7:
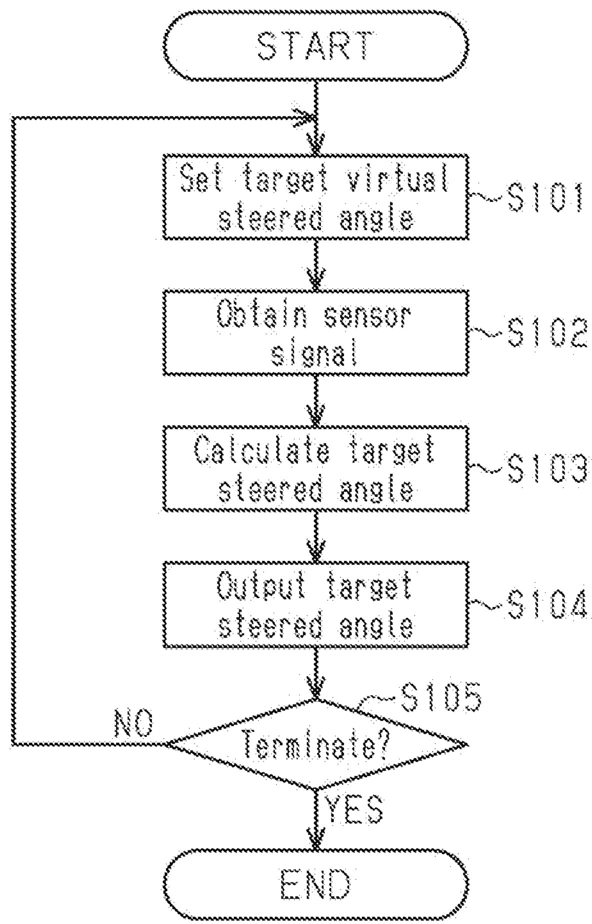
FIG. 7 is a flowchart showing a processing procedure of a backward movement assistance control executed by the backward movement control device shown in FIG. 2.

As shown in the flowchart of FIG. 7, the backward movement control device 42 first sets the target virtual steered angle $\alpha_2$* of the trailer 12 (step S101). In step S101, the backward movement control device 42 sets the target virtual steered angle $\alpha_2$* of the trailer 12 based on the electric signal S1 generated by the input device 41, that is, the operation amount or the operation position of the dial 41A with respect to the reference position. In the present embodiment, the process of step S101 corresponds to a first process.

Next, the backward movement control device 42 obtains sensor signals (step S102). In step S102, the backward movement control device 42 receives, as sensor signals, the hitch angle β detected through the hitch angle sensor 51, the vehicle speed V detected through the vehicle speed sensor 52, and the steered angle $\alpha_1$ of the front wheels 11F detected through the steered angle sensor 30C.

Next, the backward movement control device 42 calculates the target steered angle $\alpha_1$* of the front wheels 11F of the tractor 11 (step S103). In step S103, the backward movement control device 42 calculates the virtual steered angle $\alpha_2$ of the trailer 12 based on the hitch angle β, the steered angle $\alpha_1$ of the front wheels 11F, and the vehicle speed V, which have been received in step S102. Also, in step S103, the backward movement control device 42 calculates the target steered angle $\alpha_1$* of the front wheels 11F such that the calculated virtual steered angle $\alpha_2$ converges to the target virtual steered angle $\alpha_2$*. In the present embodiment, the process of step S103 corresponds to a second process.

Thereafter, the backward movement control device 42 outputs the target steered angle $\alpha_1$* of the front wheels 11F, which has been calculated in step S103, to the steering control device 30D (step S104). The steering control device 30D controls the operation of the motor 30A such that the steered angle $\alpha_1$ of the front wheels 11F detected through the steered angle sensor 30C agrees with the input target steered angle $\alpha_1$*. Thus, the virtual steered angle $\alpha_2$ of the trailer 12 follows the target virtual steered angle $\alpha_2$*. In the present embodiment, the process of step S104 corresponds to a third process.

Next, the backward movement control device 42 determines whether or not to terminate the backward movement assistance control (step S105). Specifically, in step S105, the backward movement control device 42 determines whether the operator has performed an operation to terminate the backward movement assistance control, that is, whether the operator has touched the assistance end button 21B displayed on the screen 21 of the display device 20. When the backward movement assistance control is terminated, that is, when the operator has not performed an operation for terminating the backward movement assistance control (NO in step S105), the backward movement control device 42 advances the process to step S101. When the backward movement control device 42 terminates the backward movement assistance control, in other words, when the operator has performed an operation to terminate the backward movement assistance control (YES at step S105), the process is terminated.

Operation of First Embodiment

Operation of the first embodiment will now be described.

First, a motion model of the articulated vehicle 10 at the time of a backward right turn will be described.

Figure 8:
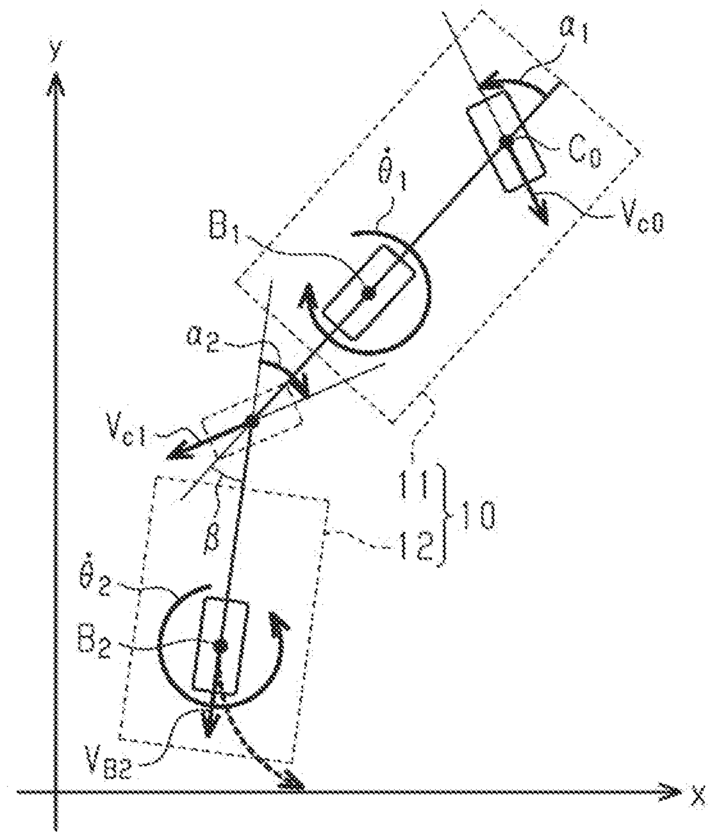
FIG. 8 is a motion model of the articulated vehicle shown in FIG. 1 during a backward right turn.

As shown in FIG. 8, in order to move the trailer 12 backward to the right in a state in which the tractor 11 and the trailer 12 are coupled to each other, the articulated vehicle 10 needs to steer the front wheels 11F of the tractor 11 to the left. The articulated vehicle 10 needs to steer the front wheels 11F in a direction opposite to that in a case in which the tractor 11 as a rigid vehicle, to which the trailer 12 is not coupled, is moved backward. At this time, direction of the orientation angular velocity $\theta_1(\bullet)$ of the tractor 11, that is, the direction of the yaw rate is the counterclockwise direction. The counterclockwise direction is a direction in which the vehicle body of the tractor 11 rotates leftward. Further, since the virtual front wheels of the trailer 12 can be regarded as being steered to the right, the direction of the orientation angular velocity $\theta_2(\bullet)$ of the trailer 12, that is, the direction of the yaw rate is the clockwise direction. The clockwise direction is a direction in which the vehicle body of the trailer 12 rotates rightward. The direction of the yaw rate of the trailer 12 is opposite to the steering direction of the front wheels 11F of the tractor 11.

Next, a motion model of the tractor 11 as a rigid vehicle, to which the trailer 12 is not coupled, at the time of a backward right turn will be described.

Figure 9:
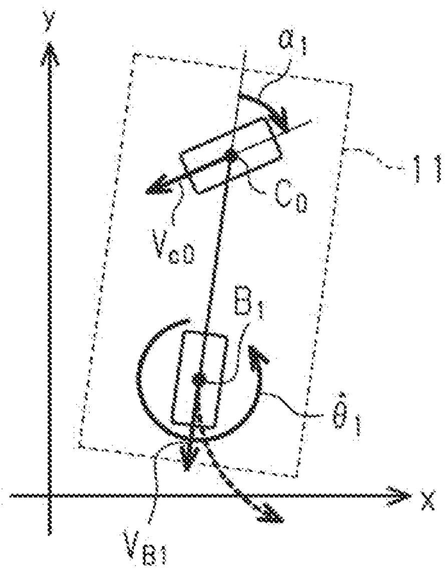
FIG. 9 is a motion model of the tractor shown in FIG. 1 regarded as a rigid vehicle during a backward right turn.

As shown in FIG. 9, in the articulated vehicle 10, the front wheels 11F of the tractor 11 as a rigid vehicle need to be steered to the right in order to move the tractor 11 backward to the right. At this time, the direction of the orientation angular velocity $\theta_1(\bullet)$ of the tractor 11, that is, the direction of the yaw rate is the clockwise direction. The direction of the yaw rate of the trailer 12 is the same as the steering direction of the front wheels 11F of the tractor 11.

Next, a description will be given of a motion model at the time of backward right turn of the trailer 12 when the trailer 12 is regarded as a rigid vehicle having virtual front wheels.

Figure 10:
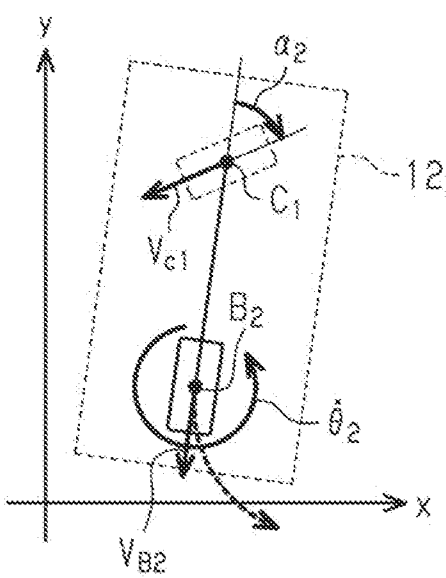
FIG. 10 is a motion model of the trailer shown in FIG. 1 regarded as a rigid vehicle during a backward right turn.

As shown in FIG. 10, in the articulated vehicle 10, in order to move the trailer 12 as a rigid vehicle backward in the right direction, the virtual front wheels of the trailer 12 need to be steered in the right direction. At this time, the direction of the orientation angular velocity $\theta_2(\bullet)$ of the trailer 12, that is, the direction of the yaw rate is the clockwise direction. The direction of the yaw rate of the trailer 12 is the same as the steering direction of the virtual front wheels of the trailer 12. That is, when the trailer 12 is regarded as a rigid vehicle having virtual front wheels, the trailer 12 as a rigid vehicle performs the same motion as that of, for example, a regular passenger car.

Therefore, just as a driver specifies the steered angle of the front wheels of a regular passenger car through the steering wheel, the operator can drive the trailer 12 in the same way as a regular passenger car by specifying the target virtual steered angle $\alpha_2$* of the trailer 12 through operation of the input device 41.

Furthermore, based on the target virtual steered angle $\alpha_2$* of the trailer 12 specified through operation of the input device 41 by the operator, the steered angle $\alpha_1$ of the front wheels 11F of the tractor 11 is controlled. This ensures that the backward movement of trailer 12 is appropriately assisted regardless of the body length of the trailer 12.

Figure 11:
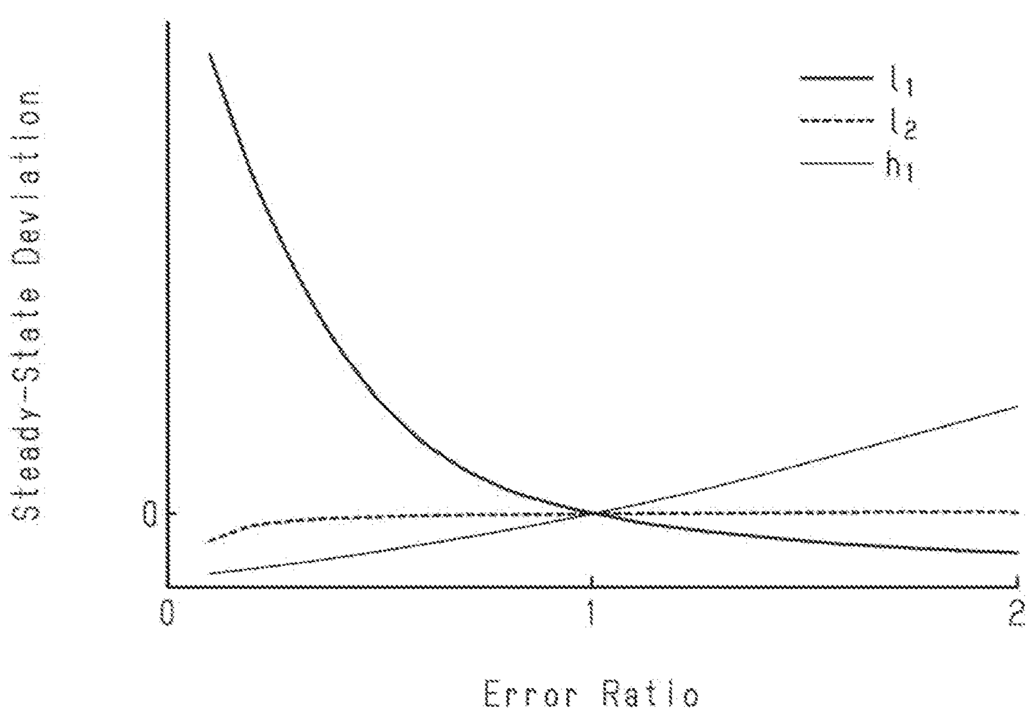
FIG. 11 is a graph showing a relationship between an error ratio and a steady-state deviation with respect to specifications of the articulated vehicle shown in FIG. 1.

As shown in the graph of FIG. 11, the steady-state deviation is substantially 0 regardless of the error ratio in the virtual wheelbase $l_2$ of the trailer 12. The steady-state deviation is the difference between the target virtual steered angle $\alpha_2$*, which is an internal target value of the backward movement control device 42, and the virtual steered angle $\alpha_2$, which is an internal controlled variable of the backward movement control device 42. The graph of FIG. 11 shows that the steered angle $\alpha_1$ of the front wheels 11F of the tractor 11 is controlled such that the virtual steered angle $\alpha_2$ of the trailer 12 agrees with the target virtual steered angle $\alpha_2$* regardless of the virtual wheel base 12 of the trailer 12 coupled to the tractor 11.

The body length of the trailer 12 necessarily becomes longer as the virtual wheelbase $l_2$ becomes longer. Also, the body length of the trailer 12 necessarily becomes shorter as the virtual wheelbase $l_2$ becomes shorter. In this manner, the virtual wheelbase $l_2$ of the trailer 12 is also a value that reflects the body length of the trailer 12. Accordingly, the graph of FIG. 11 shows that the steered angle α, of the front wheels 11F of the tractor 11 is controlled such that the virtual steered angle $\alpha_2$ of the trailer 12 agrees with the target virtual steered angle $\alpha_2$* regardless of the body length of the trailer 12 coupled to the tractor 11. The tractor 11 may be coupled to various types of trailers 12 having different body lengths. Regarding this point, the backward movement of the trailer 12 is appropriately assisted whether a trailer 12 with a longer body length is coupled to the tractor 11, or a trailer 12 with a shorter body length is coupled to the tractor 11.

As shown in the graph of FIG. 11, the steady-state deviation decreases exponentially as the error ratio in the wheelbase 11 of the tractor 11 increases. Further, the steady-state deviation gradually increases as the error ratio of the distance $h_1$ between the rear wheels 11R of the tractor 11 and the hitch point $C_1$ increases.

Advantages of First Embodiment

Accordingly, the first embodiment has the following advantages.

(1-1) By specifying the target virtual steered angle $\alpha_2$* of the trailer 12 through operation of the input device 41, the operator can control backward movement of the trailer 12 in a nonlinear and unstable system as if it were a rigid vehicle with only the tractor 11, i.e., a front-wheel steering regular passenger car. Therefore, backward movement operations of the articulated vehicle 10 are more appropriately assisted. The operator can perform a backward movement operation of the articulated vehicle 10 as if it were a regular passenger car.

(1-2) An articulated vehicle system has one feedback loop in which the state ($\alpha_1$, β, V) of the plant P, which is a controlled object, is fed back to the backward movement control device 42. By consolidating the feedback loop into one, it is possible to ensure the following performance of the virtual steered angle $\alpha_2$ with respect to the target virtual steered angle $\alpha_2$*. It is also possible to optimize the overall movement of the trailer 12. The virtual steered angle $\alpha_2$ is an internal target value of the backward movement control device 42. The virtual steered angle $\alpha_2$ is an internal controlled variable of the backward movement control device 42.

(1-3) The backward movement control device 42 calculates the target steered angle $\alpha_1$* by using a nonlinear model predictive control. The following performance of the virtual steered angle $\alpha_2$ with respect to the target virtual steered angle $\alpha_2$* is assigned a weight by the weighting matrix Q. The steered angle $\alpha_1$ of the front wheels 11F of the tractor 11, which is an operation amount, is also assigned a weight by the weighting matrix R. The weighting matrices Q and R are tuned to prevent the target steered angle $\alpha_1$* from being calculated as an excessive value, while reducing the deviation, that is, an error, of the virtual steered angle $\alpha_2$ with respect to the target virtual steered angle $\alpha_2$* of the trailer 12.

The above weight should be assigned to at least one of the following two quantities: the following performance of the virtual steered angle $\alpha_2$ with respect to the target virtual steered angle $\alpha_2$* of the trailer 12, and the steered angle $\alpha_1$ of the front wheels 11F, which is one of the state quantities of the tractor 11. This achieves at least one of the following advantages: suppressing the deviation of the virtual steered angle $\alpha_2$ with respect to the target virtual steered angle $\alpha_2$* of trailer 12, and preventing the target steering angle $\alpha_1$* from being calculated as an excessive value.

The state quantity of the tractor 11 to be assigned a weight is not limited to the steered angle $\alpha_1$ of the front wheels 11F. At least one state quantity among the steered angle $\alpha_1$ of the tractor 11, the steering angular velocity of the tractor 11, the yaw rate of the tractor 11, and the curvature of the movement trajectory of the tractor 11 may be assigned a weight. This achieves an advantage similar to that in a case in which the objected to be assigned a weight is the steered angle $\alpha_1$. For example, an abrupt behavior change in the tractor 11 is prevented.

Second Embodiment

A backward movement control device for an articulated vehicle according to a second embodiment will now be described. The present embodiment has basically the same configuration as that of the first embodiment shown in FIGS. 1 to 11. The present embodiment is different from the first embodiment in the configuration of the backward movement control device 42. The same reference numerals are given to those components that are like or the same as the corresponding components of the first embodiment and detailed explanations are omitted.

In the backward movement control of the articulated vehicle 10 in the first embodiment, motions of the tractor 11 and the trailer 12 are treated within the scope of kinematics. In kinematics, tire skidding and the like are ignored. However, in the actual backward movement operation of the articulated vehicle 10, the tractor 11 may move with a turning radius that is not intended by the operator, for example due to skidding of the tires of the front wheels 11F and the rear wheels 11R or due to the suspension geometry. Suspension geometry refers to the geometric shape or arrangement of the components of the suspension. In the present embodiment, in order to ensure the following performance of the virtual steered angle $\alpha_2$ with respect to the target virtual steered angle $\alpha_2$*, the following configuration is employed as the backward movement control device 42.

Figure 12:
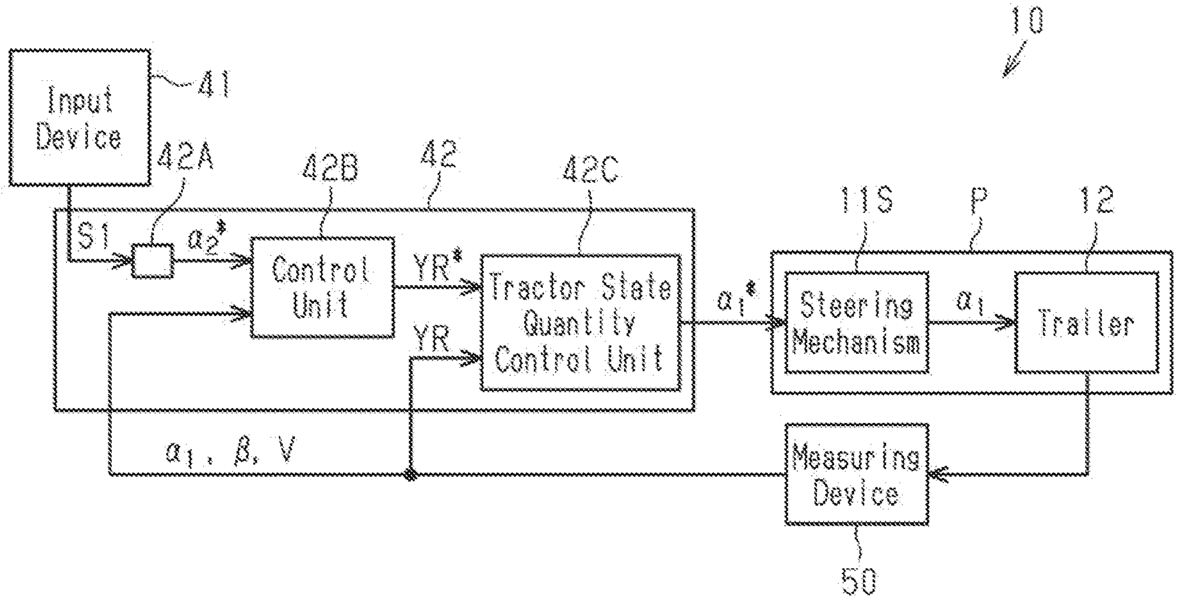
FIG. 12 is a block diagram showing a control configuration of an articulated vehicle according to a second embodiment.

As shown in FIG. 12, the backward movement control device 42 includes a tractor state quantity control unit 42C in addition to the setting unit 42A and the control unit 42B. When the control unit 42B is defined as a first control unit, the tractor state quantity control unit 42C corresponds to a second control unit. The control unit 42B, which corresponds to the first control unit, and the tractor state quantity control unit 42C, which corresponds to the second control unit, may constitute a single control unit including these functions.

The control unit 42B calculates a target yaw rate YR* of the tractor 11 based on the target virtual steered angle $\alpha_2$* set by the setting unit 42A, and the hitch angle β, the vehicle speed V, and the steered angle $\alpha_1$, which are detected through various sensors of the measuring device 50. In the present embodiment, the measuring device 50 includes a yaw rate sensor that detects the yaw rate of the tractor 11. The yaw rate of the tractor 11 is one of the state quantities of the tractor 11.

The setting unit 42A sets a target virtual steered angle $\alpha_2$* of the trailer 12 based on the electric signal S1 generated by the input device 41, that is, the operation amount or the operation position with respect to the reference position of the dial 41A.

The control unit 42B calculates the target yaw rate YR* of the tractor 11 such that the virtual steered angle $\alpha_2$ of the trailer 12 converges to the target virtual steered angle $\alpha_2$*. That is, the control unit 42B calculates the target yaw rate YR* of the tractor 11 through execution of feedback control of the virtual steered angle $\alpha_2$ such that the virtual steered angle $\alpha_2$ of the trailer 12 agrees with the target virtual steered angle $\alpha_2$*. The target yaw rate YR* is a state quantity that reflects the turning state of the tractor 11, for example, a target state quantity that is a target value of the yaw rate YR.

The tractor state quantity control unit 42C receives the target yaw rate YR* calculated by the control unit 42B and the yaw rate YR of the tractor 11 detected through the yaw rate sensor of the measuring device 50. The tractor state quantity control unit 42C calculates a target steered angle $\alpha_1$* of the front wheels 11F of the tractor 11 such that the yaw rate YR of the tractor 11 converges to the target yaw rate YR. That is, the tractor state quantity control unit 42C calculates the target steered angle $\alpha_1$* of the front wheels 11F of the tractor 11 through execution of feedback control of the yaw rate YR such that the yaw rate YR of the tractor 11 agrees with the target yaw rate YR. The absolute value of the target steered angle $\alpha_1$* increases as the absolute value of the yaw rate YR decreases with respect to the absolute value of the target yaw rate YR*. Further, the absolute value of the target steered angle $\alpha_1$* decreases as the absolute value of the yaw rate YR increases with respect to the absolute value of the target yaw rate YR*.

The state quantity of the tractor 11 used for the backward movement assistance control of the articulated vehicle 10 may be any state quantity that reflects the turning state of the tractor 11. In addition to the yaw rate YR, for example, the lateral acceleration of the tractor 11 may be used as the state quantity that reflects the turning state of the tractor 11. When the backward movement assistance control of the articulated vehicle 10 is executed using the lateral acceleration, the measuring device 50 include a lateral acceleration sensor as a component. The control unit 42B calculates the target lateral acceleration of the tractor 11 through execution of feedback control of the virtual steered angle $\alpha_2$. The tractor state quantity control unit 42C calculates the target steered angle $\alpha_1$* of the front wheels 11F through execution of feedback control of the lateral acceleration such that the lateral acceleration of the tractor 11 follows the target lateral acceleration.

Further, the state quantities that reflect the turning state of the tractor 11 include a curvature of the movement trajectory of the tractor 11. The curvature of the movement trajectory of the tractor 11 is obtained from the yaw rate YR and the vehicle speed V, for example. When the backward movement assistance control of the articulated vehicle 10 is executed by using a curvature of the movement trajectory, the control unit 42B calculates a target curvature of the movement trajectory of the tractor 11 through execution of feedback control of the virtual steered angle $\alpha_2$. The tractor state quantity control unit 42C calculates the target steered angle $\alpha_1$* of the front wheels 11F through execution of curvature feedback control such that the curvature of the movement trajectory of the tractor 11 follows the target curvature.

When the tractor 11 is, for example, a four-wheel drive vehicle in which the front wheels 11F serve as main driven wheels and the rear wheels 11R serve as auxiliary driven wheels, the tractor 11 may be provided with a control function for further improving its traveling performance. This control function includes, for example, a first control function for controlling the driving force of the left and right wheels or a second control function for controlling the braking force of the left and right wheels. The first control function is a function of controlling the yaw moment of the tractor 11 by changing the distribution ratio of driving force to the left and right driven wheels, i.e., the driven wheels on the inner side of a turn and the driven wheels on the outer side of the turn in accordance with the turning state of the tractor 11. The second control function is a function of controlling the yaw moment of the tractor 11 by changing the distribution ratio of the braking force to the left and right wheels, i.e., the wheels on the inner side of the turn and the wheels on the outer side of the turn in accordance with the turning state of the tractor 11. The distribution ratio of the driving force and the distribution ratio of the braking force can be regarded as state quantities that reflect the turning state of the tractor 11.

When the tractor 11 has the first control function, the control unit 42B may execute the backward movement assistance control of the articulated vehicle 10 using the distribution ratio of the driving force to the left and right driven wheels. At this time, the control unit 42B calculates a target distribution ratio of the driving force to the left and right driven wheels through execution of feedback control of the virtual steered angle $\alpha_2$. The tractor state quantity control unit 42C calculates the target steered angle $\alpha_1$* of the front wheels 11F through execution of feedback control of the distribution ratio such that the distribution ratio of the driving force to the left and right driven wheels follows the target distribution ratio.

When the tractor 11 has the second control function, the control unit 42B may execute the backward movement assistance control of the articulated vehicle 10 using the distribution ratio of the braking force to the left and right wheels. At this time, the control unit 42B calculates a target distribution ratio of the braking force to the left and right wheels through execution of feedback control of the virtual steered angle $\alpha_2$. The tractor state quantity control unit 42C calculates the target steered angle $\alpha_1$* of the front wheels 11F through execution of feedback control of the distribution ratio such that the distribution ratio of the braking force to the left and right wheels follows the target distribution ratio.

Advantages of Second Embodiment

Accordingly, the second embodiment has the following advantages.

(2-1) The control unit 42B calculates a target state quantity of the tractor 11 through execution of feedback control of the virtual steered angle $\alpha_2$. The target state quantity refers to a target value of a specific state quantity that reflects the turning state of the tractor 11. The tractor state quantity control unit 42C calculates the target steered angle $\alpha_1$* of the front wheels 11F through execution of feedback control of the specific state quantity. This approximates the motion of the tractor 11 to a motion model, or geometric model, in which tire skidding and the like are ignored. This also improves the following performance of the virtual steered angle $\alpha_2$ with respect to the target virtual steered angle $\alpha_2$.

(2-2) As the specific state quantity that reflects the turning state of the tractor 11, a suitable state quantity can be selected in accordance with the specification of the tractor 11 or the like. The specific state quantity is, for example, a parameter of the tractor 11, such as the yaw rate YR, the lateral acceleration, the distribution ratio of driving force to the left and right driven wheels, or the distribution ratio of the braking force to the left and right wheels.

Third Embodiment

A backward movement control device for an articulated vehicle according to a third embodiment will now be described. The present embodiment has basically the same configuration as that of the first embodiment shown in FIGS. 1 to 11. The present embodiment is different from the first embodiment in the configuration of the backward movement control device 42. Therefore, the same reference numerals are given to those components that are like or the same as the corresponding components of the first embodiment and detailed explanations are omitted.

Figure 13:
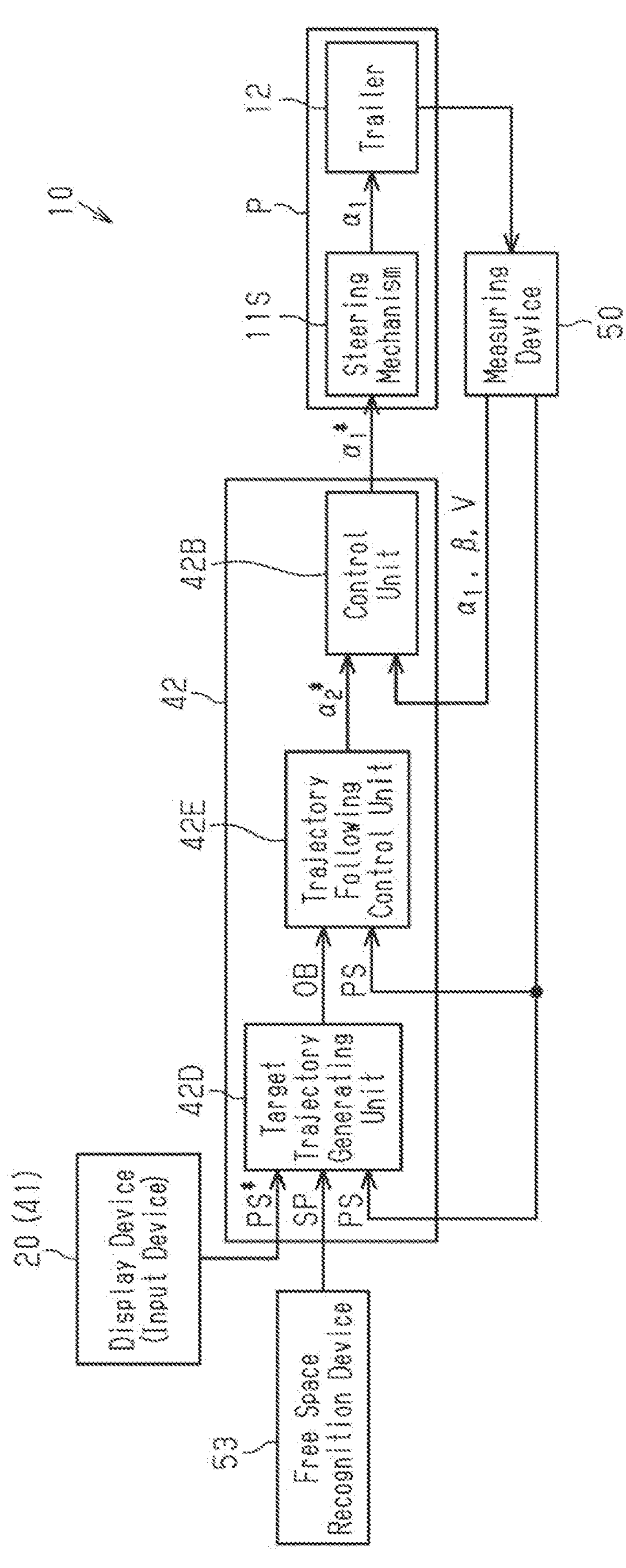
FIG. 13 is a block diagram showing a control configuration of an articulated vehicle according to a third embodiment.

As shown in FIG. 13, the backward movement control device 42 includes a target trajectory generating unit 42D and a trajectory following control unit 42E in addition to the control unit 42B. The setting unit 42A is omitted.

The target trajectory generating unit 42D receives a target position PS* of the trailer 12 specified by the operator. The target position PS* is a position to which the operator desires to move the trailer 12. The operator specifies the target position PS*, to which the operator desires to move the trailer 12, while viewing a top view, which is a video image from directly above the articulated vehicle 10 displayed on the screen 21 of the display device 20, for example. The operator specifies the target position PS* of the trailer 12 through a touch operation on the screen 21 of the display device 20.

The operator may specify the target position PS* of the trailer 12 by operating the input device 41 while viewing the top view of the articulated vehicle 10 displayed on the screen 21 of the display device 20.

The target trajectory generating unit 42D recognizes a free space SP where the trailer 12 can travel through a free space recognition device 53. The free space recognition device 53 includes, for example, multiple cameras installed in the tractor 11 and the trailer 12. The free space recognition device 53 captures a video image of the surroundings of the tractor 11 and the trailer 12, that is, the surroundings of the articulated vehicle 10 using the cameras.

The target trajectory generating unit 42D obtains a position PS, which indicates the current position of the trailer 12, through a global positioning system (GPS) sensor provided as a component of the measuring device 50. The GPS sensor receives positioning signals from artificial satellites for the global positioning system (GPS). The GPS sensor detects the position PS of the trailer 12 based on the received positioning signals. The information of the detected position includes, for example, a latitude, a longitude, and an altitude.

The target trajectory generating unit 42D generates a target trajectory OB of the trailer 12 based on the target position PS' of the trailer 12 specified by the operator, the free space SP recognized through the free space recognition device 53, and the position PS of the trailer 12 at which the trailer 12 starts to move backward. The target trajectory OB is an ideal route from the position PS of the trailer 12 to the target position PS*. The target trajectory generating unit 42D generates the target trajectory OB of the trailer 12 such that the trailer 12 does not collide with an obstacle or the like and a jackknife phenomenon does not occur. A jackknife phenomenon refers to a phenomenon in which the hitch angle $\beta$ increases at the hitch point $C_1$, which is the coupling portion between the tractor 11 and the trailer 12, when the articulated vehicle 10 is operated to move backward. The target trajectory generating unit 42D may generate the target trajectory OB of the trailer 12 based only on the target position PS* of the trailer 12 and the position PS of the trailer 12, without considering the free space SP.

The trajectory following control unit 42E receives the target trajectory OB of the trailer 12 generated by the target trajectory generating unit 42D and the position PS of the trailer 12 detected through the GPS sensor of the measuring device 50. The trajectory following control unit 42E calculates the target virtual steered angle $\alpha_2$*, which allows the trailer 12 to travel along the target trajectory OB, based on the position PS of the trailer 12 at which the trailer 12 starts to move backward.

The control unit 42B calculates the target steered angle $\alpha_1$* of the front wheels 11F of the tractor 11 based on the target virtual steered angle $\alpha_2$* set by the trajectory following control unit 42E, and the hitch angle $\beta$, the vehicle speed V, and the steered angle $\alpha_1$ of the front wheels 11F, which are detected through the measuring device 50. The control unit 42B calculates the target steered angle $\alpha_1$* of the front wheels 11F such that the virtual steered angle $\alpha_2$ of the trailer 12 converges to the target virtual steered angle $\alpha_2$*. That is, the control unit 42B calculates the target steered angle $\alpha_1$* of the front wheels 11F through execution of feedback control of the virtual steered angle $\alpha_2$ such that the virtual steered angle $\alpha_2$ of the trailer 12 agrees with the target virtual steered angle $\alpha_2$*.

The steered angle $\alpha$, of the front wheels 11F of the tractor 11 is controlled so as to follow the target steered angle $\alpha_1$* calculated in the above-described manner, which allows the trailer 12 to travel along the target trajectory OB. In this manner, the steering wheel is automatically controlled toward the target position PS* of the trailer 12, which is specified by the operator. This allows the operator to concentrate on operation of the accelerator and the brakes. The operator can move the trailer 12 to the target position PS' while adjusting the backward movement speed of the articulated vehicle 10 through operation of the accelerator and the brakes.

The backward movement control device 42 may automatically control operations of the accelerator, the brakes, and the gear selection through other vehicle control devices. Accordingly, an automatic backward movement system for the trailer 12 is constructed. After specifying the target position PS' of the trailer 12, the operator can complete the backward movement operation of the trailer 12 simply by touching the assistance start button 21A displayed on the screen 21 of the display device 20. The steering wheel, the accelerator, the brakes, and the gear selection are automatically controlled by various vehicle control devices including the steering control device 30D. This allows the trailer 12 to smoothly move to the target position PS*. However, the gear selection may be switched by the operator.

Advantages of Third Embodiment

Accordingly, the third embodiment has the following advantages.

(3-1) The steered angle $\alpha$, of the steering wheel, that is, the front wheels 11F of the tractor 11, is automatically controlled toward the target position PS' of the trailer 12, which is specified by the operator. This allows the operator to concentrate on operation of the accelerator and the brakes. The operator can move the trailer 12 to the target position PS' while adjusting the backward movement speed of the articulated vehicle 10 through operation of the accelerator and the brakes.

(3-2) The trailer 12 can be regarded as a rigid vehicle having virtual front wheels. By taking advantage of this feature, an automatic backward movement system for the articulated vehicle 10 can be constructed. For example, based on the fact that the internal controlled variable of the control unit 42B is the virtual steered angle $\alpha_2$ of the trailer 12, an existing automatic parking control for a regular passenger car can be applied to the automatic backward movement control of the trailer 12. Therefore, it is not necessary to newly develop a control for causing the trailer 12 to follow the target trajectory OB.

Fourth Embodiment

A backward movement control device for an articulated vehicle according to a fourth embodiment will now be described. The present embodiment has basically the same configuration as that of the first embodiment shown in FIGS. 1 to 11. The present embodiment is different from the first embodiment in that the tractor 11 has an automatic parking function. Therefore, the same reference numerals are given to those components that are like or the same as the corresponding components of the first embodiment and detailed explanations are omitted.

Figure 14:
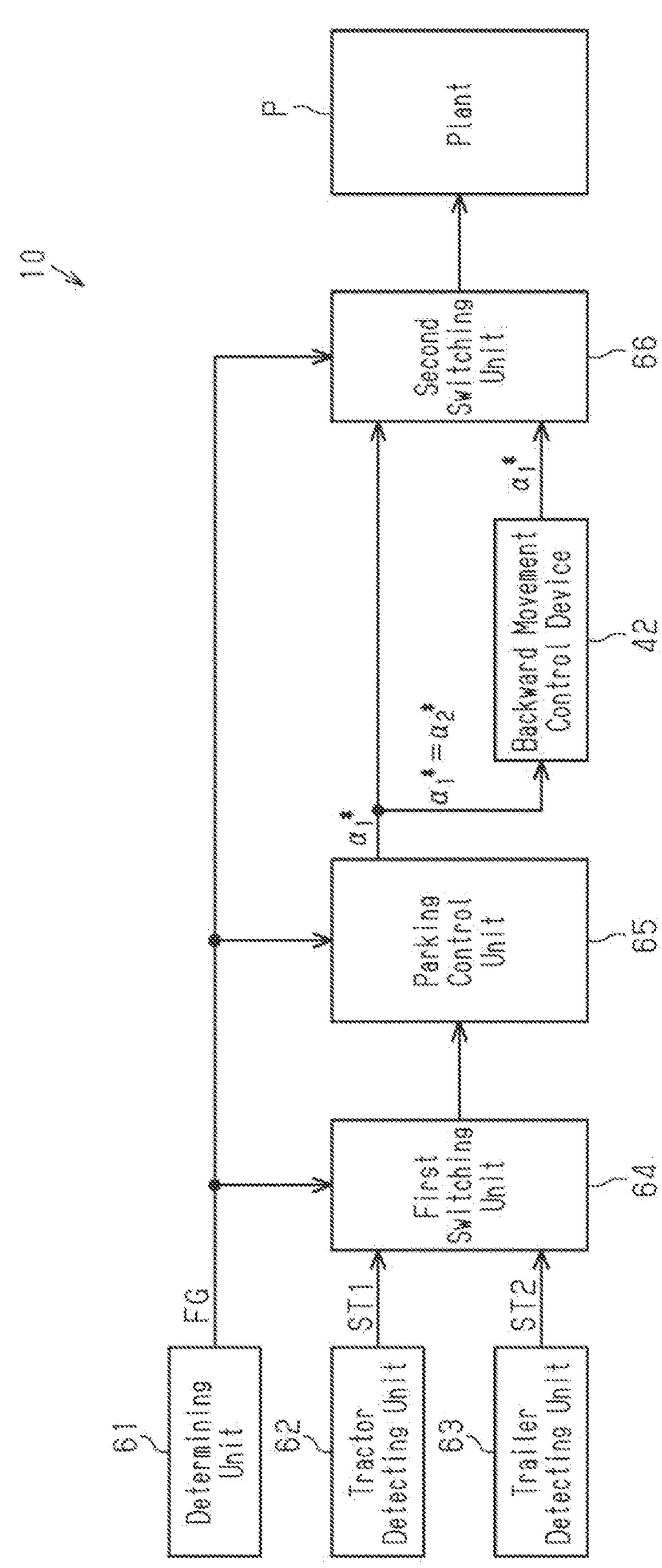
FIG. 14 is a block diagram showing a control configuration of an articulated vehicle according to a fourth embodiment.

As shown in FIG. 14, the feedback control system of the articulated vehicle 10 includes a backward movement control device 42, and a plant P, which is a controlled object. The feedback control system of the articulated vehicle 10 includes a determining unit 61, a tractor detecting unit 62, a trailer detecting unit 63, a first switching unit 64, a parking control unit 65, and a second switching unit 66. The parking control unit 65 is a higher-level control device with respect to the backward movement control device 42.

The determining unit 61 determines whether the trailer 12 is coupled to the tractor 11. The determining unit 61 determines whether the trailer 12 is coupled to the tractor 11 based on, for example, a detection result of a sensor that detects coupling of the trailer 12 to the tractor 11. When it is determined that the trailer 12 is coupled to the tractor 11, the determining unit 61 sets the value of a flag FG to 1. When it is determined that the trailer 12 is not coupled to the tractor 11, the determining unit 61 sets the value of the flag FG to 0.

The tractor detecting unit 62 detects peripheral information of the tractor 11 and state quantities of the tractor 11. The tractor detecting unit 62 includes a camera, a radar, and the like for detecting peripheral information of the tractor 11. The tractor detecting unit 62 includes various sensors for detecting state quantities of the tractor 11. The tractor detecting unit 62 generates an electric signal ST1 including the detected peripheral information of the tractor 11 and the state quantities of the tractor 11.

The trailer detecting unit 63 detects peripheral information of the trailer 12 and state quantities of the trailer 12. The trailer detecting unit 63 includes a camera, a radar, and the like for detecting peripheral information of the trailer 12. The trailer detecting unit 63 includes various sensors for detecting state quantities of the trailer 12. The trailer detecting unit 63 generates an electric signal ST2 including the detected peripheral information of the trailer 12 and the state quantities of the trailer 12.

The first switching unit 64 switches an electric signal to be supplied to the parking control unit 65 in accordance with the value of the flag FG set by the determining unit 61. When the value of the flag FG is 0, that is, when the trailer 12 is not coupled to the tractor 11, the first switching unit 64 supplies the electric signal ST1, which is generated by the tractor detecting unit 62, to the parking control unit 65. When the value of the flag FG is 1, that is, when the trailer 12 is coupled to the tractor 11, the first switching unit 64 supplies the electric signal ST2, which is generated by the trailer detecting unit 63, to the parking control unit 65.

When the automatic parking function is activated, the parking control unit 65 calculates the target steered angle $\alpha_1$* of the front wheels 11F of the tractor 11 in a manner corresponding to the value of the flag FG, which is set by the determining unit 61. When the value of the flag FG is 0, that is, when the trailer 12 is not coupled to the tractor 11, the parking control unit 65 generates the target trajectory of the tractor 11 based on the parking space specified by the operator and the position of the tractor 11 detected through the GPS sensor. The target trajectory is an ideal route from the current position of the tractor 11 to the parking space, which is the target position. The parking control unit 65 generates the target trajectory of the tractor 11 such that the tractor 11 does not collide with an obstacle or the like. Based on the generated target trajectory of the tractor 11 and the current position of the tractor 11, the parking control unit 65 calculates the target steered angle $\alpha_1$* of the front wheels 11F, which allows the tractor 11 to travel along the target trajectory. The target steered angle $\alpha_1$* of the front wheels 11F calculated at this time is a signal related to the tractor 11. The function of the parking control unit 65 calculating the target steered angle $\alpha_1$* of the front wheels 11F when the value of the flag FG is 0, that is, when the trailer 12 is not coupled to the tractor 11 corresponds to a first calculation function.

When the value of the flag FG is 1, that is, when the trailer 12 is coupled to the tractor 11, the parking control unit 65 regards the trailer 12 as a rigid vehicle having virtual front wheels and generates the target trajectory of the trailer 12. The parking control unit 65 generates a target trajectory of the trailer 12 as a rigid vehicle based on, for example, a parking space specified through a specific operation by the operator and the position of the trailer 12 detected through the GPS sensor. The target trajectory is an ideal route from the current position of the trailer 12 to the parking space, which is the target position. The parking control unit 65 generates the target trajectory of the trailer 12 such that the trailer 12 does not collide with an obstacle or the like and a jackknife phenomenon does not occur. Based on the generated target trajectory of the trailer 12 and the current position of the trailer 12, the parking control unit 65 calculates the virtual target steered angle $\alpha_1$* of the front wheels, which allows the trailer 12 as the rigid vehicle to travel along the target trajectory. The target steered angle $\alpha_1$* calculated at this time is equal to the target virtual steered angle $\alpha_2$* of the trailer 12. Thus, when the value of the flag FG is 1, that is, when the trailer 12 is coupled to the tractor 11, the function of the parking control unit 65 that calculates the target steered angle $\alpha_1$* of the front wheels 11F corresponds to a second calculation function.

The backward movement control device 42 sets the target virtual steered angle $\alpha_2$* to the target steered angle $\alpha_1$* of the front wheels 11F that is calculated by the parking control unit 65. The backward movement control device 42 calculates the target steered angle $\alpha_1$* of the front wheels 11F such that the virtual steered angle $\alpha_2$ of the trailer 12 converges to the target virtual steered angle $\alpha_2$*. That is, the control unit 42B calculates the target steered angle $\alpha_1$* of the front wheels 11F through execution of feedback control of the virtual steered angle $\alpha_2$ such that the virtual steered angle $\alpha_2$ of the trailer 12 agrees with the target virtual steered angle $\alpha_2$*. The target steered angle $\alpha_1$* of the front wheels 11F calculated at this time is a signal related to the trailer 12.

The second switching unit 66 switches the electric signal to be supplied to the plant P in accordance with the value of the flag FG set by the determining unit 61. When the value of the flag FG is 0, that is, when the trailer 12 is not coupled to the tractor 11, the second switching unit 66 supplies the target steered angle $\alpha_1$* of the front wheels 11F that is calculated by the parking control unit 65 to the plant P. When the value of the flag FG is 1, that is, when the trailer 12 is coupled to the tractor 11, the second switching unit 66 supplies the target steered angle $\alpha_1$* of the front wheels 11F that is calculated by the backward movement control device 42 to the plant P.

The steering control device 30D controls the operation of the motor 30A such that the steered angle $\alpha_1$ of the front wheels 11F detected through the steered angle sensor 30C agrees with the target steered angle $\alpha_1$*. Thus, when the trailer 12 is not coupled to the tractor 11, the tractor 11 can travel along the target trajectory. Through execution of the automatic parking function, the tractor 11 automatically moves from the current position to the specified parking space. When the trailer 12 is coupled to the tractor 11, the trailer 12 can travel along the target trajectory. Through execution of the automatic parking function, the trailer 12 automatically moves from the current position to the specified parking space.

Advantages of Fourth Embodiment

Accordingly, the fourth embodiment has the following advantages.

(4-1) The signal used for the automatic parking is switched between the signal related to the tractor 11 and the signal related to the trailer 12 depending on whether the trailer 12 is coupled to the tractor 11. When the trailer 12 is coupled to the tractor 11, the trailer 12 is regarded as a rigid vehicle having virtual front wheels, and the target steered angle $\alpha_1$* of the virtual front wheels of the trailer 12 is calculated. That is, the target steered angle $\alpha_1$* is calculated by the same processing procedure as that in the case in which the trailer 12 is not coupled to the tractor 11. The target steered angle $\alpha_1$* calculated at this time is equal to the target virtual steered angle $\alpha_2$* of the trailer 12. Therefore, when the trailer 12 is coupled to the tractor 11, the target virtual steered angle $\alpha_2$* is set to the target steered angle $\alpha_1$*, and the target steered angle $\alpha_1$* of the front wheels 11F is calculated to achieve the set target virtual steered angle $\alpha_2$*. The feedback control of the steered angle α, is executed such that the steered angle at of the front wheels 11F follows the target steered angle $\alpha_1$*, which allows the trailer 12 to travel along the target trajectory. Thus, an existing automatic parking logic can be used to automatically park the trailer 12.

(4-2) The same the logic of the automatic parking function of the tractor 11 as a rigid vehicle is used both when the trailer 12 is not coupled to the tractor 11 and when the trailer 12 is coupled to the tractor 11. This allows the trailer 12 to perform automatic backward movement in a cost-effective manner.

Other Embodiments

The above-described embodiments may be modified as follows. The above-described embodiments and the following modifications can be combined as long as the combined modifications remain technically consistent with each other.

As in the first and second embodiments, when the steering mechanism of the tractor 11 is of a type in which the front wheels 11F and the steering wheel are coupled to each other in a power transmittable manner, the input device 41 may employ the following configuration. For example, the input device 41 may be configured to include a slider in place of the dial 41A. The backward movement control device 42 sets the target virtual steered angle $\alpha_2$* of the trailer 12 based on the position of the slider. The backward movement control device 42 calculates the target virtual steered angle $\alpha_2$* corresponding to the position of the slider by using, for example, a map that defines the relationship between the position of the slider and the target virtual steered angle $\alpha_2$* of the trailer 12. The slider may be a dedicated component for specifying a backward movement direction or a backward movement path of the articulated vehicle 10, or may be a slider for operating another vehicle on-board device.

As in the first and second embodiments, when the steering mechanism of the tractor 11 is of a type in which the front wheels 11F and the steering wheel are coupled to each other in a power transmittable manner, the input device 41 may employ the following configuration. For example, the input device 41 may be a display device such as a touch screen provided in the vicinity of the driver's seat in the passenger compartment. An icon of a virtual steering wheel is displayed on the screen of the display device. The display device may be the above-described display device 20, or may be a display device different from the display device 20. The operator specifies the backward movement direction or the backward movement path of the articulated vehicle 10 by touching or sliding a finger on the virtual steering wheel displayed on the screen of the display device. The backward movement control device 42 sets the target virtual steered angle $\alpha_2$* of the trailer 12 based on the position in the virtual steering wheel at which operator touches or the amount of finger sliding on the virtual steering wheel.

In the first to fourth embodiments, a steer-by-wire type steering mechanism, in which there is no power transmission between the front wheels 11F and the steering wheel, may be employed as the steering mechanism of the tractor 11. For example, in the first and second embodiments, the steering wheel may be used as the input device 41. This is because the front wheels 11F and the steering wheel can be moved independently of each other. The front wheels 11F of the tractor 11 are steered through driving of a steering motor. For example, the steering wheel is switched to function as the input device 41 when the backward movement assistance function of the articulated vehicle 10 is activated from a deactivated state. The operator operates the steering wheel to specify the backward movement direction or the backward movement path of the articulated vehicle 10. The backward movement control device 42 sets the target virtual steered angle $\alpha_2$ of the trailer 12 based on the operation position or the operation amount of the steering wheel.

In the first to fourth embodiments, a variable gear ratio steering system may be employed as the steering mechanism of the tractor 11. A variable gear ratio steering system changes a gear ratio that is the ratio between a turned angle of the steering wheel and the steered angle of the front wheels 11F, through driving of a variable gear ratio (VGR) motor that is provided on the steering shaft to improve the steering performance. For example, in the first and second embodiments, when there is a range in which the steering wheel and the front wheels 11F can be moved independently of each other, the steering wheel may be caused to function as the input device 41 within the range.

In the first to fourth embodiments, as the steering mechanism of the tractor 11, a steering mechanism may be employed that includes a front-wheel steering mechanism that couples the front wheels 11F and the steering wheel in a power transmittable manner and a rear-wheel steering mechanism that can steer the rear wheels 11R independently. For example, in the first and second embodiments, a steering wheel may be used as the input device 41. This is because the steering wheel and the front wheels 11F are coupled to each other while the rear wheels 11R are free to move. The rear wheels 11R are steered through driving of a steering motor.

In the first to fourth embodiments, the target virtual steered angle $\alpha_2$* of the trailer 12, which is specified through an operation of the input device 41, may be increased or reduced through an operation of a button for operating an existing vehicle on-board device. For example, when the backward movement assistance function of the articulated vehicle 10 is activated from a deactivated state, the function of the button of the vehicle on-board device is switched from operating the vehicle on-board device to specifying the backward movement direction or the backward movement path of the trailer 12. Examples of the vehicle on-board device include an audio device, a radio, and an air conditioner. The operator can finely adjust the target virtual steered angle $\alpha_2$* of the trailer 12 through operation of the button of the vehicle on-board device.

In the first to fourth embodiments, the backward movement control device 42 may inhibit steering intervention by the operator during execution of the backward movement assistance control. The backward movement control device 42 detects steering intervention by the operator based on the steering torque $\tau_{str}$ detected by the torque sensor 30B, for example. When steering intervention by the operator is detected, the backward movement control device 42 warns the operator to stop the steering intervention or stop execution of the backward movement assistance control. The warning is performed by, for example, displaying a message on the display device 20 or emitting a sound through a speaker mounted on the vehicle.

In the first to fourth embodiments, the tractor 11 may have an autonomous driving function. For example, the tractor 11 may be configured to be operated remotely. This allows an operator who is remotely located from the articulated vehicle 10 to operate the articulated vehicle 10 using telecommunication technology. The backward movement direction or the backward movement path of the articulated vehicle 10 is specified through remote control. The remote control is performed by operating an operation member of a remote control device, for example. The articulated vehicle 10 may be operated selectively within the passenger compartment or remotely from outside the passenger compartment.

The expression "at least one" as used herein means "one or more" of desired options. As an example, the expression "at least one" as used herein means "only one option" or "both of two options" if the number of options is two. As another example, the expression "at least one" used herein means "only one option" or "a combination of any two or more options" if the number of options is three or more.

The invention claimed is:

1. A backward movement control device for an articulated vehicle, the articulated vehicle including a tractor including steered wheels that change a traveling direction of the articulated vehicle and a trailer towed by the tractor, wherein the tractor is equipped with a power steering device, including a motor, configured to execute feedback control for causing a steered angle of the steered wheels to follow a target steered angle, the backward movement control device includes one or more processors configured to calculate the target steered angle by executing feedback control for causing a virtual steered angle to follow a target virtual steered angle in response to a backward movement operation of the articulated vehicle being performed, the virtual steered angle is a steered angle of steered wheels that are virtually present in the trailer under an assumption that the trailer is a rigid vehicle separated from the tractor, the target virtual steered angle is a target value of the virtual steered angle that is set through a specific operation by an operator, the virtual steered angle is an internal controlled variable of the one or more processors, and the target steered angle is an output of the feedback control for causing the virtual steered angle to follow the target virtual steered angle.

2. The backward movement control device for the articulated vehicle according to claim 1, wherein the tractor includes a dial that is operable by the operator, the specific operation is an operation of the dial, the one or more processors are further configured to:

set the target virtual steered angle based on an operation amount or an operation position of the dial, and calculate the target steered angle by executing feedback control for causing the virtual steered angle to follow the set target virtual steered angle.

3. The backward movement control device for the articulated vehicle according to claim 1, wherein the one or more processors are further configured to:

calculate a target state quantity through execution of feedback control for causing the virtual steered angle to follow the target virtual steered angle, the target state quantity being a target value of a state quantity that reflects a turning state of the tractor; and calculate the target steered angle through execution of feedback control for causing the state quantity that reflects the turning state of the tractor to follow the target state quantity.

4. The backward movement control device for the articulated vehicle according to claim 1, wherein the tractor includes a sensor that detects a current position of the trailer, and the one or more processors are further configured to:

generate, based on a target position of the trailer specified through the specific operation and a position of the trailer detected through the sensor, a target trajectory that is an ideal route from the current position of the trailer to the target position, calculate, based on the position of the trailer detected through the sensor, the target virtual steered angle for causing the trailer to travel along the target trajectory, and calculate the target steered angle by executing feedback control for causing the virtual steered angle to follow the target virtual steered angle.

5. The backward movement control device for the articulated vehicle according to claim 1, wherein the tractor includes a parking control unit configured to execute an automatic parking function, and the parking control unit includes:

a first calculation function of calculating, in response to the trailer not being coupled to the tractor, the target steered angle for causing the tractor to travel along a target trajectory, the target trajectory being generated based on a parking space specified by the operator and a position of the tractor; and a second calculation function of calculating, in response to the trailer being coupled to the tractor, the target steered angle for causing the trailer to travel along a target trajectory generated based on the parking space and a position of the trailer regarded as the rigid vehicle, the one or more processors are configured to set the target virtual steered angle to the target steered angle and to calculate the target steered angle by executing feedback control for causing the virtual steered angle to follow the set target virtual steered angle, and in response to the trailer not being coupled to the tractor, the target steered angle calculated through the first calculation function is supplied to the power steering device, whereas in response to the trailer being coupled to the tractor, the target steered angle that is calculated by the one or more processors is supplied to the power steering device.

6. The backward movement control device for the articulated vehicle according to claim 1, wherein the one or more processors are configured to execute a process of calculating the target steered angle by using nonlinear model predictive control, and a process of assigning a weight to at least one of a following performance of the virtual steered angle with respect to the target virtual steered angle or a state quantity of the tractor.

7. The backward movement control device for the articulated vehicle according to claim 6, wherein the state quantity to which a weight is assigned through the process of the one or more processors is at least one of a steered angle of the tractor, a steering angular velocity of the tractor, a yaw rate of the tractor, or a curvature of a movement trajectory of the tractor.

8. A non-transitory computer-readable medium storing a backward movement control program executed by a backward movement control device including one or more processors for an articulated vehicle, the articulated vehicle including a tractor including steered wheels that change a traveling direction of the articulated vehicle and a trailer towed by the tractor, the tractor being equipped with a power steering device, including a motor, configured to execute feedback control for causing a steered angle of the steered wheels to follow a target steered angle, wherein the backward movement control program is configured to cause, in response to a backward movement operation of the articulated vehicle being performed, the backward movement control device to execute;

a first process of setting a target virtual steered angle;

a second process of calculating the target steered angle by executing feedback control for causing a virtual steered angle to follow the target virtual steered angle set in the first process; and a third process of supplying the target steered angle calculated in the second process to the power steering device, the virtual steered angle is a steered angle of steered wheels that are virtually present in the trailer under an assumption that the trailer is a rigid vehicle separated from the tractor, the target virtual steered angle is a target value of the virtual steered angle that is set through a specific operation by an operator, the virtual steered angle is an internal controlled variable of the one or more processors, and the target steered angle is an output of the feedback control for causing the virtual steered angle to follow the target virtual steered angle.

9. A backward movement control method for an articulated vehicle, the articulated vehicle including a tractor including steered wheels that change a traveling direction of the articulated vehicle and a trailer towed by the tractor, the tractor being equipped with a power steering device, including a motor, configured to execute feedback control for causing a steered angle of the steered wheels to follow a target steered angle, wherein the backward movement control method comprises:

calculating the target steered angle by executing feedback control for causing a virtual steered angle to follow a target virtual steered angle in response to a backward movement operation of the articulated vehicle being performed, wherein the virtual steered angle is a steered angle of steered wheels that are virtually present in the trailer under an assumption that the trailer is a rigid vehicle separated from the tractor, the target virtual steered angle is a target value of the virtual steered angle that is set through a specific operation by an operator, the virtual steered angle is an internal controlled variable of the backward movement control method, and the target steered angle is an output of the feedback control for causing the virtual steered angle to follow the target virtual steered angle.

10. The backward movement control device for the articulated vehicle according to claim 1, wherein:

the target steered angle is calculated based on a deviation between the virtual steered angle and the target virtual steered angle; and the target virtual steered angle is directly set by the specific operation of the operator.

* * * * *